United States Patent
Mudda et al.

(10) Patent No.: US 11,421,996 B2
(45) Date of Patent: Aug. 23, 2022

(54) METHOD, APPARATUS, AND SYSTEM FOR COMPARING AND ASSIMILATING ROAD LANE REPRESENTATIONS USING GEOSPATIAL DATA AND ATTRIBUTE DATA

(71) Applicant: HERE Global B.V., Eindhoven (NL)

(72) Inventors: Swathi Sree Durga Mudda, Vijayawada (IN); Shishir Saxena, Mumbai (IN); Amitabh Nayar, Chicago, IL (US); Saurabh Dubey, Indore (IN)

(73) Assignee: HERE GLOBAL B.V., Eindhoven (NL)

( * ) Notice: Subject to any disclaimer, the term of this patent is extended or adjusted under 35 U.S.C. 154(b) by 292 days.

(21) Appl. No.: 16/752,112

(22) Filed: Jan. 24, 2020

(65) Prior Publication Data
US 2021/0231444 A1    Jul. 29, 2021

(51) Int. Cl.
*G01C 21/32* (2006.01)
*G06T 7/60* (2017.01)

(52) U.S. Cl.
CPC ............... *G01C 21/32* (2013.01); *G06T 7/60* (2013.01); *G06T 2207/30256* (2013.01)

(58) Field of Classification Search
CPC .. G01C 21/32; G06T 7/60; G06T 2207/30256
See application file for complete search history.

(56) References Cited

U.S. PATENT DOCUMENTS

| | | | |
|---|---|---|---|
| 9,664,787 B2 | 5/2017 | Kim | |
| 9,689,690 B2 | 6/2017 | Rolf | |
| 2008/0253688 A1 | 10/2008 | Safra et al. | |
| 2011/0280453 A1* | 11/2011 | Chen | G06T 7/75 382/113 |
| 2017/0284812 A1* | 10/2017 | Kim | G01C 21/3658 |
| 2019/0179304 A1 | 6/2019 | Iagnemma | |
| 2020/0073977 A1* | 3/2020 | Montemerlo | G06F 16/2365 |

OTHER PUBLICATIONS

Driemel et al., "Locality-Sensitive Hashing of Curves", retrieved on Dec. 27, 2019 from https://arxiv.org/pdf/1703.04040.pdf, Mar. 11, 2017, 19 pages.

(Continued)

*Primary Examiner* — Kenneth J Malkowski
(74) *Attorney, Agent, or Firm* — Ditthavong, Steiner & Mlotkowski

(57) ABSTRACT

An approach is provided for comparing and assimilating road lane representations. The approach, for example, receiving two cartographic feature representations (e.g., digital road lane representations). The approach also involves computing a geometric similarity between the cartographic representations. The approach further involves processing attribute data associated with the cartographic feature representations to determine a semantic relationship between the representations. The approach further involves generating a recommendation with respect to assimilating the representations based on the geometric similarity and the semantic relationship, and providing the recommendation as an output.

18 Claims, 19 Drawing Sheets

(56) References Cited

OTHER PUBLICATIONS

Bang et al., "An Iterative Process for Matching Network Data Sets with Different Level of Detail", The International Archives of the Photogrammetry, Remote Sensing and Spatial Information Sciences, vol. XXXVIII-4/C7, retrieved on Dec. 27, 2019 from https://pdfs.semanticscholar.org/fd90/47899726fe532df3872d2ebc1bd55f505232.pdf, 5 pages.
Office Action for European Patent Application No. 21152577.9-1001, dated Jun. 29, 2021, 11 pages.
Zhang, "Methods and Implementations of Road-Network Matching", Jan. 15, 2010, retrieved on Jul. 13, 2021 from https://d-nb.info/1000039323/34, 149 pages.

\* cited by examiner

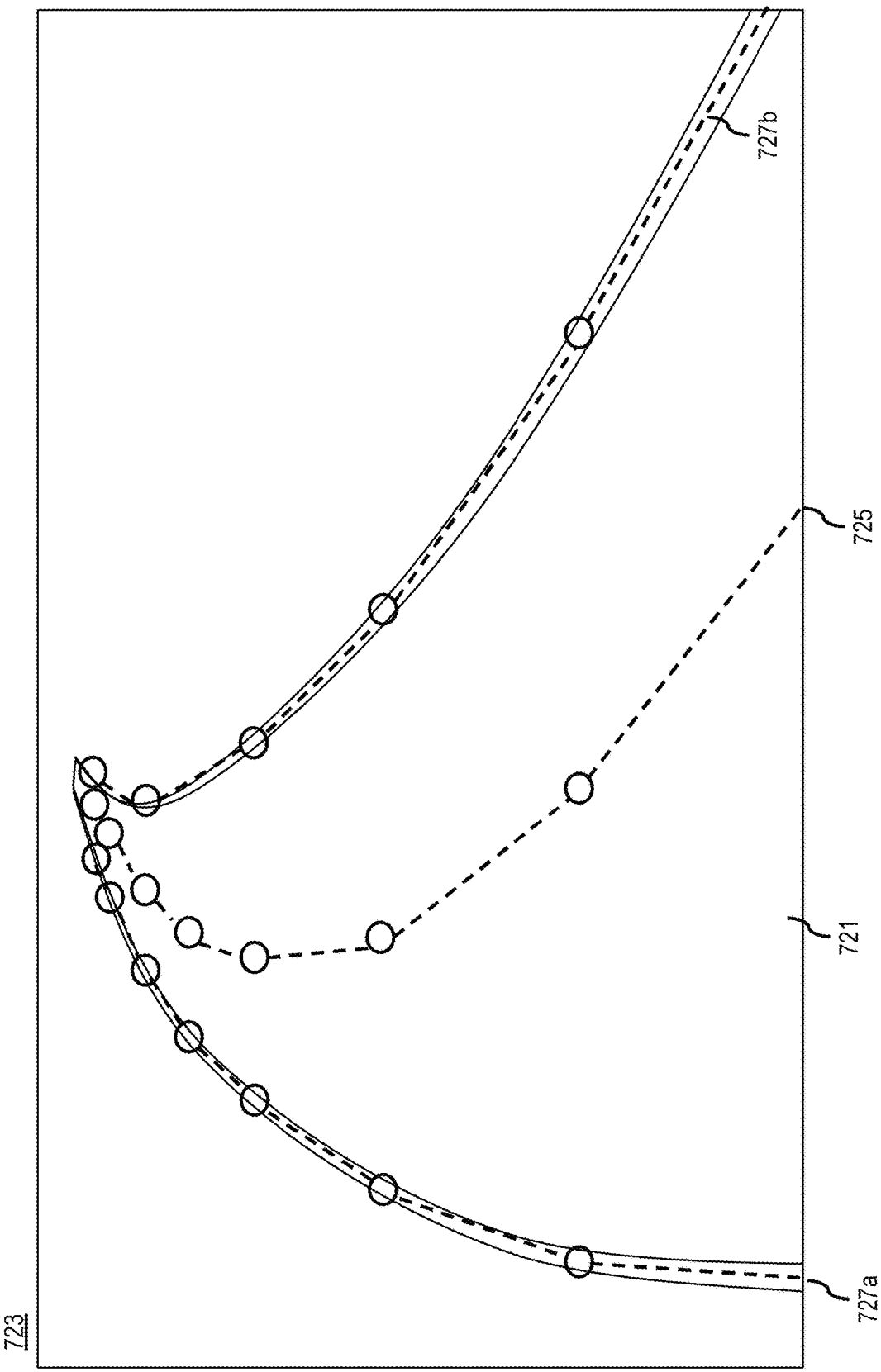

METHOD, APPARATUS, AND SYSTEM FOR COMPARING AND ASSIMILATING ROAD LANE REPRESENTATIONS USING GEOSPATIAL DATA AND ATTRIBUTE DATA

BACKGROUND

Navigation and mapping service providers rely on generating and maintaining digital maps to provide a range of services and applications. These digital maps often include digitized representations of various geospatially referenced cartographic map features (e.g., road lanes, building boundaries, terrain features, etc.) that are continually updated from a variety of sources. However, because of the inherent error and uncertainty of generating digitized cartographic representations (e.g., polylines or link/node-based representations of road lanes), service provider face significant technical challenges with respect to comparing two cartographic representations (e.g., road lane representations) to determine whether those two representations represent the same feature (e.g., the same road) or the different features (e.g., different roads).

Some Example Embodiments

Therefore, there is a need for comparing and assimilating road lanes or other cartographic map features for digital map making and related services and applications.

According to one embodiment, a method comprises receiving a first cartographic feature representation (e.g., a first road lane representation) and a second cartographic feature representation (e.g., a second road lane representation). The method also comprises computing a geometric similarity between the first cartographic feature representation and the second cartographic feature representation. The method further comprises processing attribute data associated with the first cartographic feature representation and the second cartographic feature representation to determine a semantic relationship between the first cartographic feature representation and the second cartographic feature representation. The method further comprises generating a recommendation with respect to assimilating the first cartographic feature representation and the second cartographic feature representation based on the geometric similarity and the semantic relationship. The method further comprises providing the recommendation as an output.

According to another embodiment, an apparatus comprises at least one processor, and at least one memory including computer program code for one or more computer programs, the at least one memory and the computer program code configured to, with the at least one processor, cause, at least in part, the apparatus to receive a first cartographic feature representation and a second cartographic feature representation. The apparatus is also caused to compute a geometric similarity between the first cartographic feature representation and the second cartographic feature representation. The apparatus is further caused to process attribute data associated with the first cartographic feature representation and the second cartographic feature representation to determine a semantic relationship between the first cartographic feature representation and the second cartographic feature representation. The apparatus is further caused to generate a recommendation with respect to assimilating the first cartographic feature representation and the second cartographic feature representation based on the geometric similarity and the semantic relationship. The apparatus is further caused to provide the recommendation as an output.

According to another embodiment, a computer-readable storage medium carries one or more sequences of one or more instructions which, when executed by one or more processors, cause, at least in part, an apparatus to receive a first cartographic feature representation and a second cartographic feature representation. The apparatus is also caused to compute a geometric similarity between the first cartographic feature representation and the second cartographic feature representation. The apparatus is further caused to process attribute data associated with the first cartographic feature representation and the second cartographic feature representation to determine a semantic relationship between the first cartographic feature representation and the second cartographic feature representation. The apparatus is further caused to generate a recommendation with respect to assimilating the first cartographic feature representation and the second cartographic feature representation based on the geometric similarity and the semantic relationship. The apparatus is further caused to provide the recommendation as an output.

According to another embodiment, an apparatus comprises means for receiving a first cartographic feature representation and a second cartographic feature representation. The apparatus also comprises means for computing a geometric similarity between the first cartographic feature representation and the second cartographic feature representation. The apparatus further comprises means for processing attribute data associated with the first cartographic feature representation and the second cartographic feature representation to determine a semantic relationship between the first cartographic feature representation and the second cartographic feature representation. The apparatus further comprises means for generating a recommendation with respect to assimilating the first cartographic feature representation and the second cartographic feature representation based on the geometric similarity and the semantic relationship. The apparatus further comprises means for providing the recommendation as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A-7C are diagrams of example use cases for comparing and assimilating cartographic representations, according to various embodiments;

DESCRIPTION OF SOME EMBODIMENTS

Figure 1A:
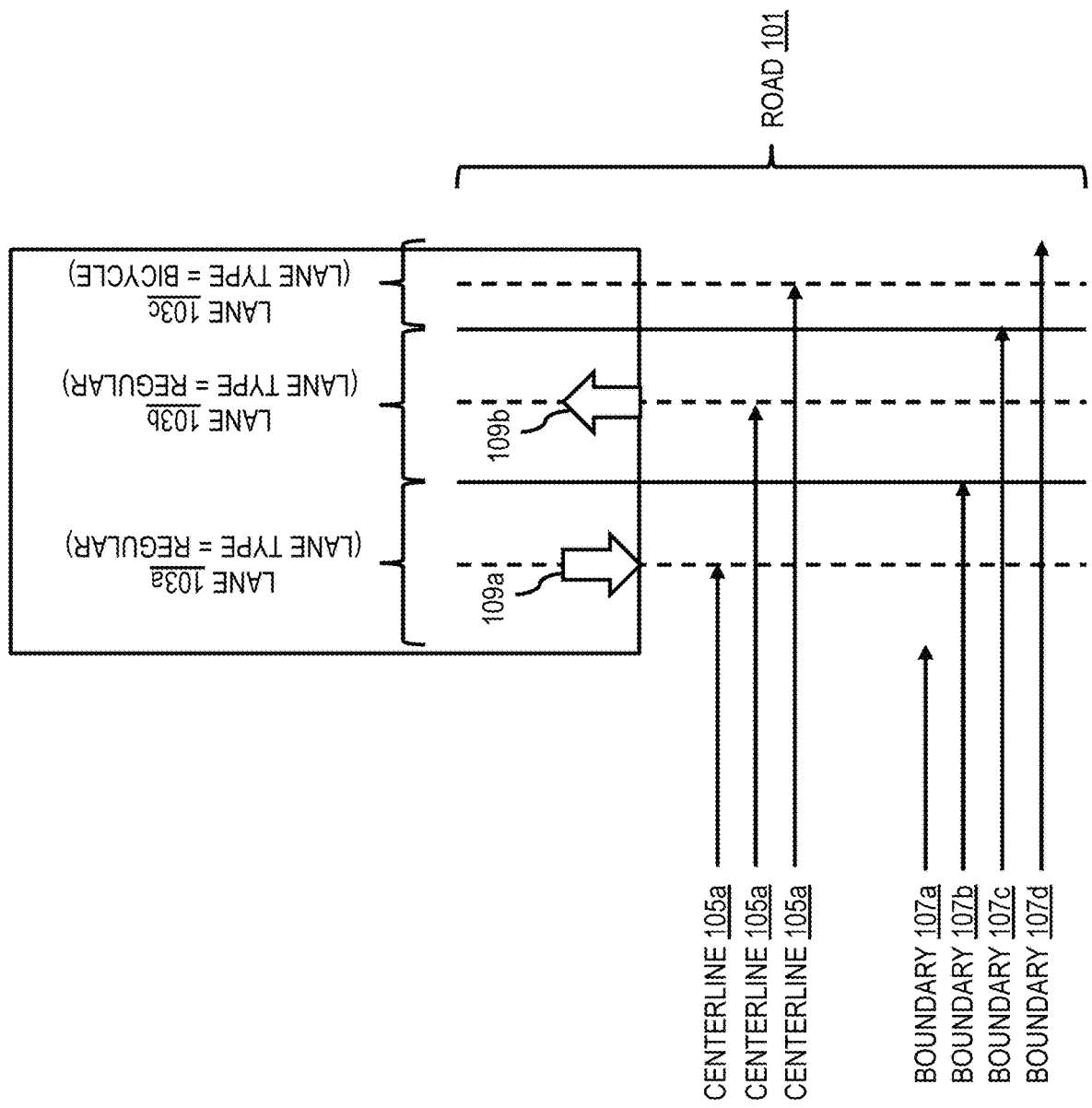
FIGS. 1A-1E are diagrams of an example road lane representations, according to one embodiment.

Examples of a method, apparatus, and computer program for comparing and assimilating cartographic representations (e.g., representation of road lanes or other cartographic/map features) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Location-based services and applications generally rely on map data that include accurate and up-to-date digital representations of cartographic or map features located in the mapped geographic area. These cartographic or map features can include but are not limited to road lanes, buildings, terrain features, political boundaries, etc. By way of example, lanes provisioned on a road or any other cartographic feature could be digitized in a software world in multiple ways. The digital representations of these features can either be made available integral to the respective digitized roads/features or could exist as independent entities loosely coupled to the roads/features.

In some cases, depending on the type of cartographic feature being represented, further representation options may be available. For example, in the case of representing road lanes, even when the lanes are represented as independent entities, the road lane representation either can be represented as a grouped data structure with each lane representation being a data element up to the total number of lanes on the given road section, or can be represented as an individual entity itself, again loosely coupled across neighboring lanes as well as to the underlying road.

In one embodiment, considering that each lane is represented as an individual entity, each lane representation can be referenced or described with respect to a centerline geometry of the lane, boundary geometry of the lane, or both. Also, each lane representation can have attribute data that further characterizes the lane using attributes that are not related to the geometry of the lane. For example, attribute data can include business attributions such as but not limited to direction of travel, speed, vehicles allowed, functional class, etc. Hence, the lane or other cartographic feature representations in this case would be deterministically geospatial content.

Representation of geographic or geospatial content could be implied through various mechanisms or formats. One example representation is a geoJSON representation which is an open mapping and data interchange standard that uses text (e.g., linear text strings) to simply but effectively describe a geographical feature with locations and attributes. Each type of this geographical feature in geoJSON would essentially pertain to encapsulate a specific category of content to satisfy respective business needs of end users (e.g., encapsulate specific attributes types selected by the end users) while adhering to the prescribed standard. It is noted that geoJSON is provided by way of illustration and not as a limitation, and that it is contemplated that any type of cartographic representation that includes both feature geometry data and related attribute data can be used.

In one embodiment, cartographic features such as the lanes on a given section of road can be easily represented independently in geoJSON format as a linear geospatial string along with their specific attributions. This lane representation can have reference to its boundaries separately, where each boundary can be represented through a different geoJSON or equivalent representation itself. Additionally, the underlying road could be referenced as well for the given lane.

FIG. 1A illustrates the components of a road 101 that can be included in corresponding road lane representation, according to one embodiment. As shown, the road 101 includes three lanes 103a-103c, with two road lanes 103a-103b classified as regular road lanes (e.g., Lane Type=Regular) that support vehicular traffic and one road lane 103c classified as a bicycle lane (e.g., Lane Type=Bicycle) that supports only bicycle traffic. The representations of the lanes 103a-103c can be based on their respective centerlines 105a-105c and may also reference their respective boundaries 107a-107c. The representation of linear features such as the centerlines 105a-105c and boundaries 107a-107d can be based on polylines, links/nodes, or other equivalent representations.

Figure 1B:
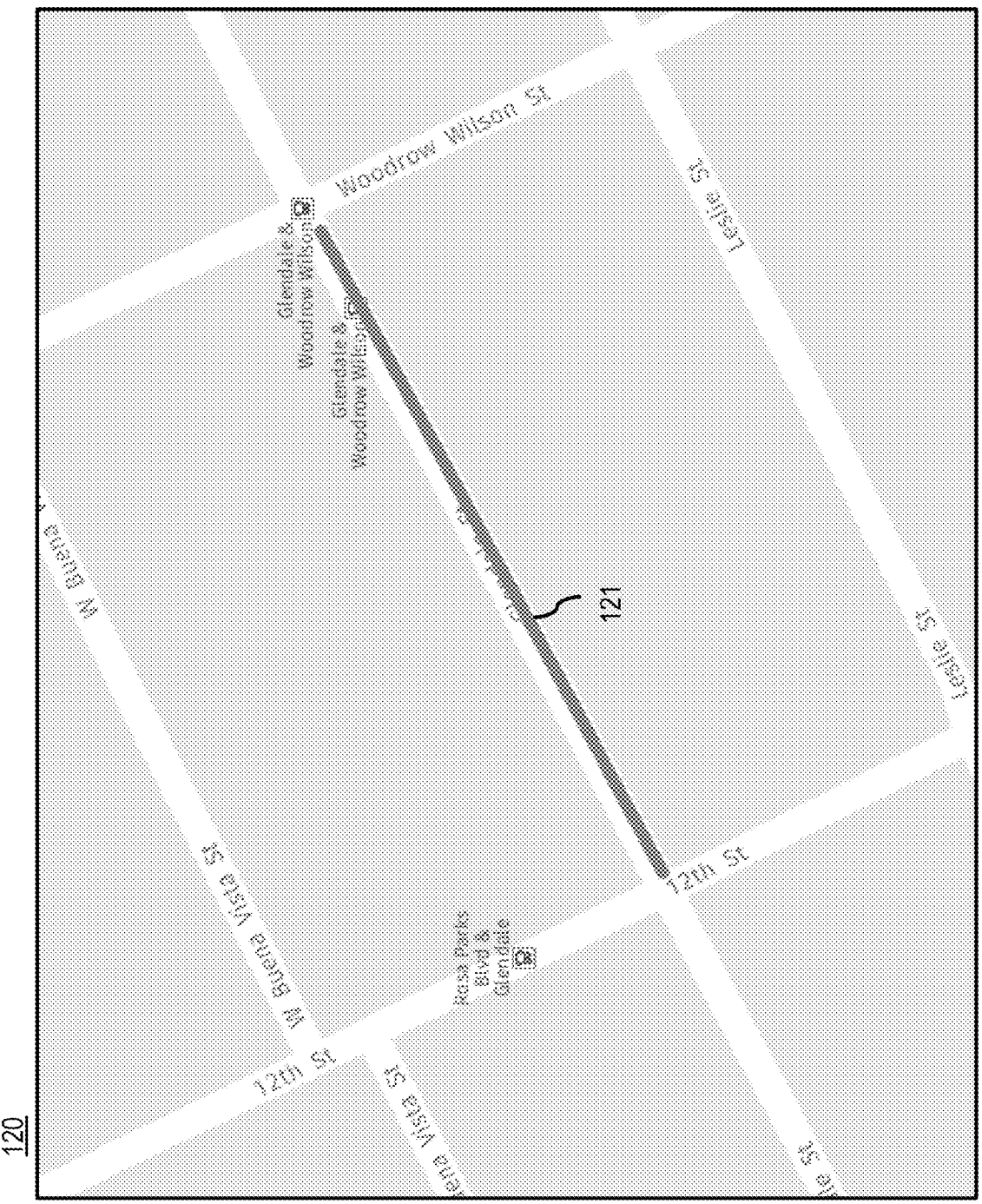

As discussed above, the format for the representation includes but is not limited to geoJSON, and the lanes can be represented independently as single lanes or grouped together in multi-lane representations. Table 1 Below illustrates an example geoJSON representation of a road lane that includes geometric data (e.g., geocoordinates describing the extent of the lanes) and attribute data (e.g., travel direction, lane type, and vehicles allowed on the lane). The geoJSON of Table 1 also includes reference to independent representations of the lane boundaries and the underlying road containing the lane. FIG. 1B illustrates a mapping user interface 120 that visualizes the lane 121 represented by the geoJSON of Table 1.

TABLE 1

Example 1: Sample Independent Lane Representation In geoJSON

```
{
    "type": "FeatureCollection",
    "features": [
{
        "id":
"15af5c01-e415-41e0-8132-f9c23def6dad",
        "type": "Feature",
        "geometry": {
            "type": "LineString",
            "coordinates": [
                [
                    -83.11112486327369,
                    42.39341436797087,
                    0.0
                ],
                [
                    -83.10898565385118,
                    42.39422126316387,
                    0.0
                ]
            ]
        },
        "properties": {
            "laneboundaryReference": [
                {
                    "featureId":
"c1c441fb-b7af-4b0d-b378-0feefb9c68ff",
                    "side": "LEFT"
                },
```

TABLE 1-continued

Example 1: Sample Independent Lane Representation In geoJSON

```
                {
                    "featureId":
"c89e5e31-5a3b-4dbb-b6d2-21aff7abcf2b",
                    "side": "RIGHT"
                }
            ],
            "travelDirection": "BACKWARD",
            "typeofLane": "REGULAR",
            "vehiclesAllowed": [
                "BUS",
                "CAR",
                "TRUCK"
            ],
            "roadReference": {
                "id":
"de942a29-bf6a-4dba-ba1d-bc6d9286f456",
                "lengthInMeters": 61.215507852245686
            }
        }
    }
    ]
}
```

Figure 1C:
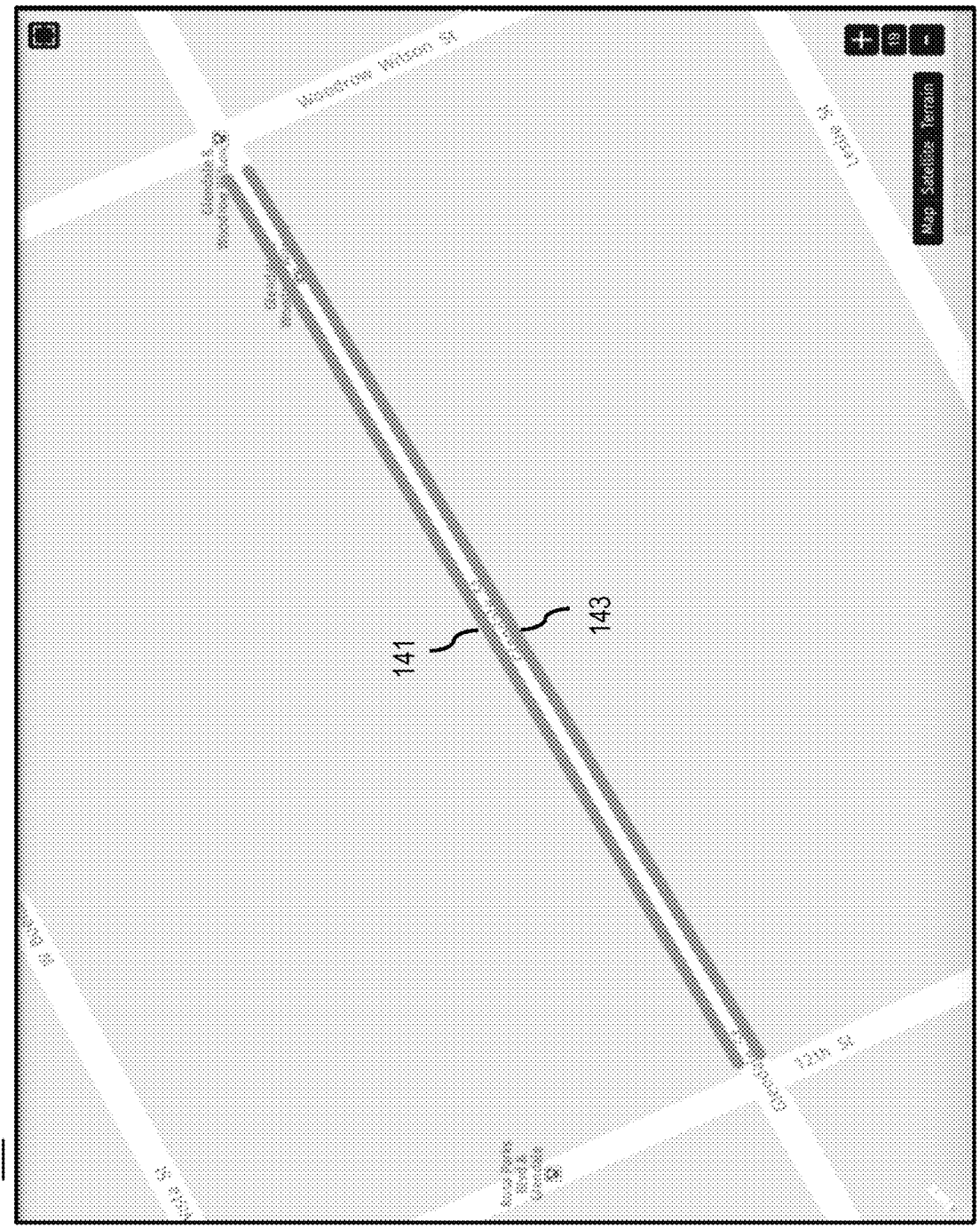

As noted above, in one embodiment, the representation can group multiple lanes of a road into a single geoJSON representation. An example of this type of multiple lane representation is illustrated in Table 2 below. In the example of Table 2 two lane representations occurring on a road is appended together using a geoJSON representation. The geoJSON of Table includes separate sections for each lane, with each section describing the lane geometry, lane attributes, associated boundaries, and associated underlying road. FIG. 1C illustrates a mapping user interface 140 that visualizes the lanes 141 and 142 represented by the geoJSON of Table 2.

TABLE 2

Example 2: Multiple Lanes On A Given Road In geoJSON

```
{
    "type": "FeatureCollection",
    "features": [
        {
            "id":
"15af5c01-e415-41e0-8132-f9c23def6dad",
            "type": "Feature",
            "geometry": {
                "type": "LineString",
                "coordinates": [
                    [
                        -83.11112486327369,
                        42.39341436797087,
                        0.0
                    ],
                    [
                        -83.10898565385118,
                        42.39422126316387,
                        0.0
                    ]
                ]
            },
            "properties": {
                "laneboundaryReference": [
                    {
                        "featureId":
"c1c441fb-b7af-4b0d-b378-0feefb9c68ff",
                        "side": "LEFT"
                    },
                    {
                        "featureId":
"c89e5e31-5a3b-4dbb-b6d2-21aff7abcf2b",
                        "side": "RIGHT"
                    }
```

TABLE 2-continued

Example 2: Multiple Lanes On A Given Road In geoJSON

```
            ],
            "travelDirection": "BACKWARD",
            "typeofLane": "REGULAR",
            "vehiclesAllowed": [
                "BUS",
                "CAR",
                "TRUCK"
            ],
            "roadReference": {
                "id":
                "de942a29-bf6a-4dba-ba1d-bc6d9286f456",
                "lengthInMeters": 61.215507852245686
            }
        }
    },
    {
        "id":
        "549a5561-2c4a-4a3c-b27b-1252a8233a7b",
        "type": "Feature",
        "geometry": {
            "type": "LineString",
            "coordinates": [
                [
                    -83.11114689599856,
                    42.393446461271076,
                    0.0
                ],
                [
                    -83.10900768576843,
                    42.39425335687064,
                    0.0
                ]
            ]
        },
        "properties": {
            "laneboundaryReference": [
                {
                    "featureId":
                    "c89e5e31-5a3b-4dbb-b6d2-21aff7abcf2b",
                    "side": "LEFT"
                },
                {
                    "featureId":
                    "43c5f31b-3158-4f1e-be77-c5a4f5202869",
                    "side": "RIGHT"
                }
            ],
            "travelDirection": "FORWARD",
            "typeofLane": "REGULAR",
            "vehiclesAllowed": [
                "BUS",
                "CAR",
                "TRUCK"
            ],
            "roadReference": {
                "id":
                "de942a29-bf6a-4dba-ba1d-bc6d9286f456",
                "lengthInMeters": 61.215507852245686
            }
        }
    }
    ]
}
```

In one embodiment, many services and application aggregate cartographic representations from a variety of different sources or from the same source at different times, thereby leading to the potential of receiving the representations of the same cartographic that must be assimilated or otherwise reconciled. However, because of the inherent error in many of the representations, it can be technically challenging to determine when the aggregated cartographic representations correspond to the same or different cartographic features. An incorrect comparison or assimilation of cartographic representations can in turn lead to inaccuracy in the digital map data or in the services or applications that depend on the comparison.

Figure 1D:
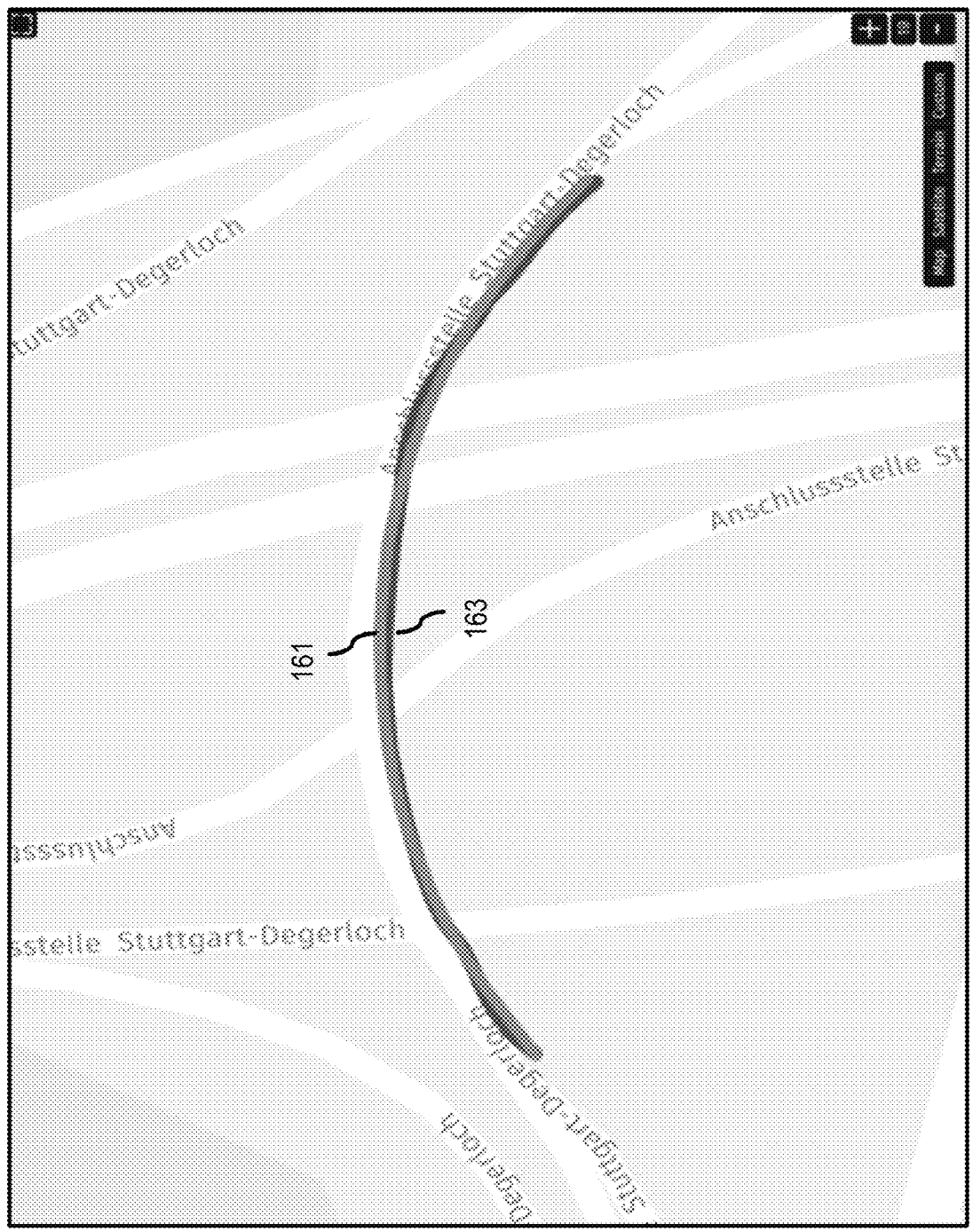
Figure 1E:
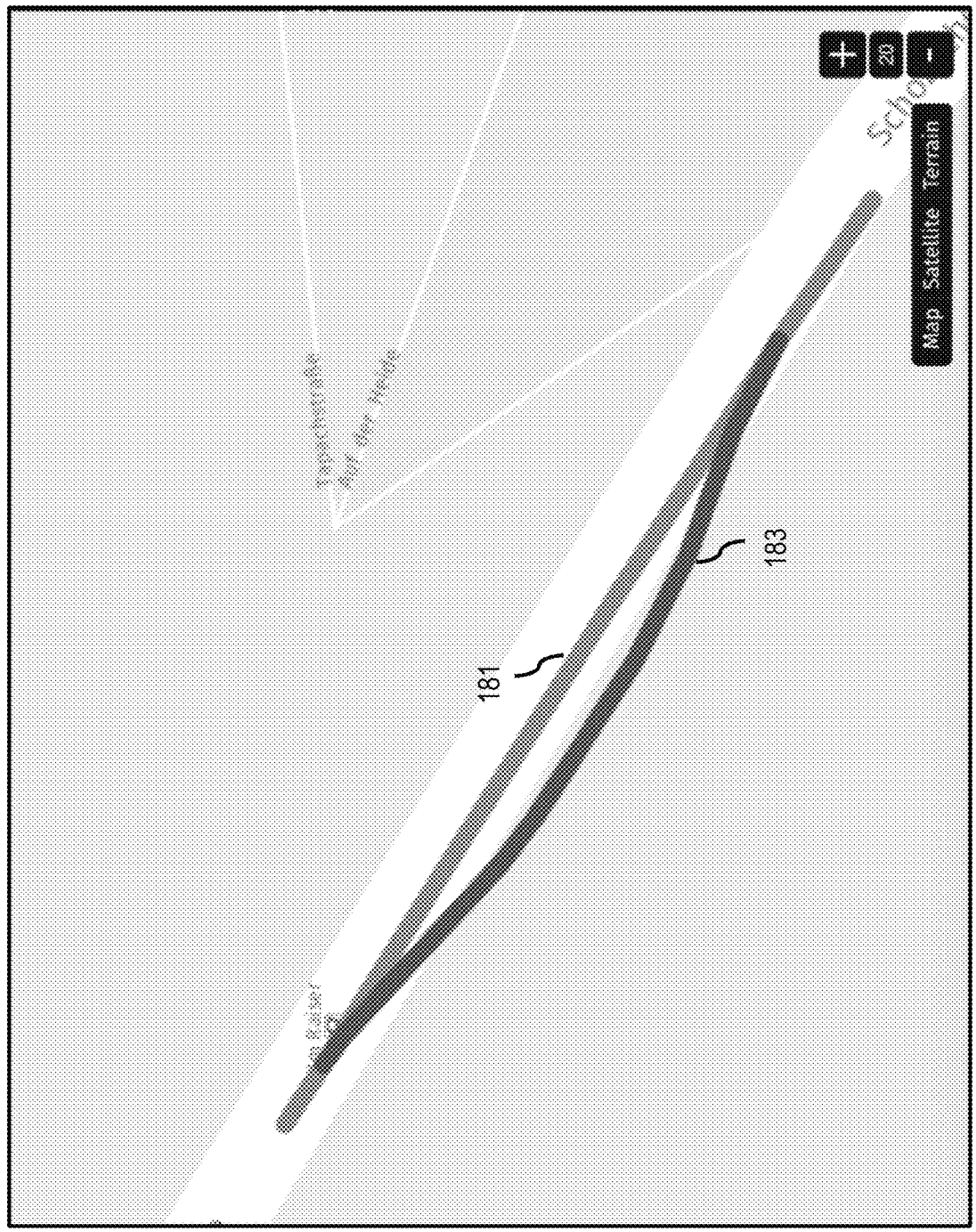

FIGS. 1D and 1E illustrate example scenarios in which a comparison of road lane representations may be needed. More specifically, FIG. 1D illustrates a mapping user interface 160 that visualizes an example in which a first road lane representation 161 overlaps with a second road lane representation 163. In this case, a system receiving the road lane representations 161 and 163 may find it technically challenging to determine whether road lane representations 161 and 163 correspond to the same road lane or corresponding respectively to adjacent road lanes. FIG. 1E illustrates a mapping user interface 180 that visualizes another example in which a first road lane representation 181 only partially overlaps with the second road lane representation 183. This partial overlap makes it technically challenging to determining whether the two road lane representations 181 and 183 are the same or different. Also if the lane representations 181 and 183 are different, the technical challenge of determining their relationship to each other (e.g., whether lane representation 183 is a shoulder lane to lane representation 181) remains.

Figure 2:
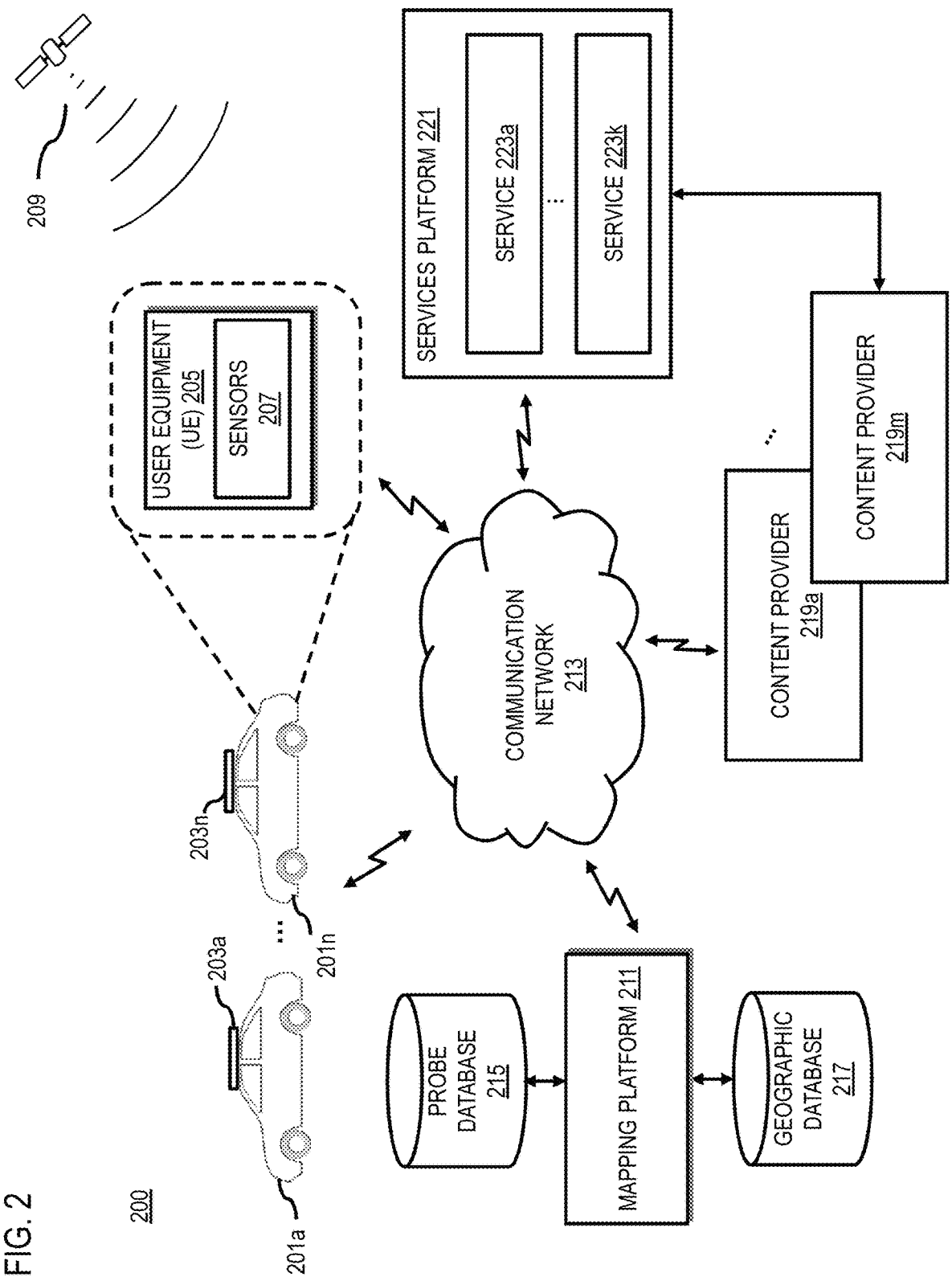
FIG. 2 is a diagram of a system capable of comparing and assimilating cartographic representations (e.g., road lane representations), according to one embodiment.

To address these technical challenges, a system 200 of FIG. 2 provides a generic and configurable mechanism which not only compares the geospatial features of any two or more given cartographic representations (e.g., road lane representations), provisioned through different sources or at different timelines by same source, by using their geometric data (e.g., coordinate geometry) in combination with their attribute data (e.g., business attributions). In one embodiment, the system 200 also provides the appropriate recommendations/feedback to assimilate the representations based on the comparison. Although various examples and embodiments may be discussed with respect to road lane representations, it is contemplated that the embodiments described herein are applicable to any type of cartographic representation including but not limited to building boundaries, political boundaries, terrain features, etc. In one embodiment, the cartographic representations are defined using any format that includes specifying geometry data (e.g., the physical location, arrangement, size, boundary, etc. of a cartographic feature) and attribute data (e.g., data characterizing the non-geometric properties or attributes of the cartographic feature such as direction of travel, traffic speed, traffic volume, functional class, etc.). As discussed above, one example format is geoJSON, but it is contemplated that any equivalent format can be used in the embodiments described herein. In one embodiment, the system 200 can perform the boundaries using other feature representations referenced in the original representations being compared. For example, if a road lane representation is provided with respect to the centerline of the lane, then the representations corresponding to the boundaries of the lane can also be used for the comparison (e.g., comparing a boundary of a first lane representation to a boundary of a second lane representation). In other words, the system 200 also encompasses comparison of the adjoining boundaries of the lanes as separate geospatial linear features.

In summary, the embodiments of the system 200 provides a technical solution for meeting a definitive requirement to compare two or more cartographic representations to determine whether they are the same or different in light of the uncertainty or error associated with each cartographic representation. As discussed above, the inherent error in generating the representations can make it technically challenging to perform the comparison and assimilation of cartographic features. For example, one mechanism to generate cartographic representations (e.g., road lane representations) is to collection probe data from vehicles 201a-201n (also collectively referred to as vehicles 201) equipped with respective sensors 203a-203n (also collectively referred to as sensors 203) to collection location data for generating the probe data as the vehicles 201 travel over a road network. In some use causes, user equipment (UE) devices 205 (e.g., smartphones, personal navigation devices, etc.) equipped with respective sensors 207 can also be used to generate probe data. The sensors 203 and 207 can include positioning sensors (e.g., Global Positioning System (GPS) receivers configured to receive location signals from positioning satellites 209). In this way, the probe vehicles 201 and/or probe UE 205 can periodically sample and report their locations as probe data to the mapping platform 211 over a communication network 213 for storage in the probe database 215.

The mapping platform 211 can then process the probe database 215 to determine probe trajectories for identifying and generating cartographic representations (e.g., road lane representations using polylines or links/nodes) for storage in a geographic database 217. However, the positioning systems (e.g., GPS) used to generate probe data generally has positioning errors of several meters or more depending environmental conditions. This positioning error can then get carried to some degree to the resulting cartographic representations. In cases where the mapping platform 211 receives the cartographic representations from third parties (e.g., content providers 219a-219m, services platform 221, and/or any of the services 223a-223k of the services platform 221), the variability remains because those third parties often use the same techniques for mapping a region.

In an example scenario in which two independent lane representations (e.g., contributed either through different sources or through different timeframes) on a same road section are under comparison, the system 200 can consider whether the two lane representations are considered close enough (e.g., within a proximity threshold) through geometry while also considering the inherent attributions/business properties of the lane representations. For example, a lane representation on a given road which has attribute data indicating a specific type (e.g., Lane Type="regular" indicating that it supports normal vehicular traffic) and direction contributed by one source can be compared against another similar looking "close enough" lane in same direction contributed through different source. This close enough lane representation could be either an adjacent lane or an overlapping one. The system 200 uses the geometry data in combination with the attribute data of the two lane representations to distinguish between the two cases and then output a recommendation for assimilating the two lane representations if needed. In this way, the system 200 not only compares whether they are same or different but give an assimilated lane feature while accommodating attributions as well. In addition, the remarks or feedback regarding an assimilation recommendation could also be provisioned.

In one embodiment, the system 200 provides a deterministic mechanism of comparing geospatial content (e.g., cartographic representations) using both the geometrical coordinates and the associated attributions. To determine geometric similarity as part of the comparison, the system 200 can use a distance metric such as but not limited to a Hausdorff distance or equivalent. In one embodiment, the system 200 also determines and provides a concrete relationship between the representations (e.g., lane representations) under scrutiny as well as the relevant recommendations regarding assimilation.

The embodiments described herein provide for several technical advantages and features including but not limited to:

The system 200 provides one stop shop for comparison and recommendation regarding assimilation of cartographic representations as geospatial features;

The system 200 not only performs a comparison but also establishes various types of relationships between cartographic representations;

In one embodiment, instead of or in addition to initiating the assimilation of the compared cartographic representations, the system 200 provides recommendations to downstream applications or services to make decisions based on context specific to the individual application or service;

The system 200 determines that for each type of cartographic representation or feature (e.g., road lanes or boundary lines), a different comparison threshold can be provided.

The system 200 uses open standard formats (e.g., geoJSON or equivalent) as the base representation to provide adaptability across various organizations that may not use proprietary formats;

The system 200 is extensible to accommodate any geometric feature or attributed encoded in different representation formats (e.g., geoJSON-based "linear string" feature) and can based its comparison and assimilation recommendation on attributes beyond those associated with the underlying cartographic feature (e.g., road lanes);

This system 200 covers the comparison of cartographic representations for a variety of use cases including but not limited to overlapping cases, intersections, etc.; and In one embodiment, the system 200 generates a unique identification (e.g., a hash) derived from the business properties and geometry of the cartographic representations (e.g., representations of lanes and their boundaries), to avoid redundant similarity analysis by comparing the unique identification in lieu of recomputing the geometric similarity and attribute analysis.

Figure 3:
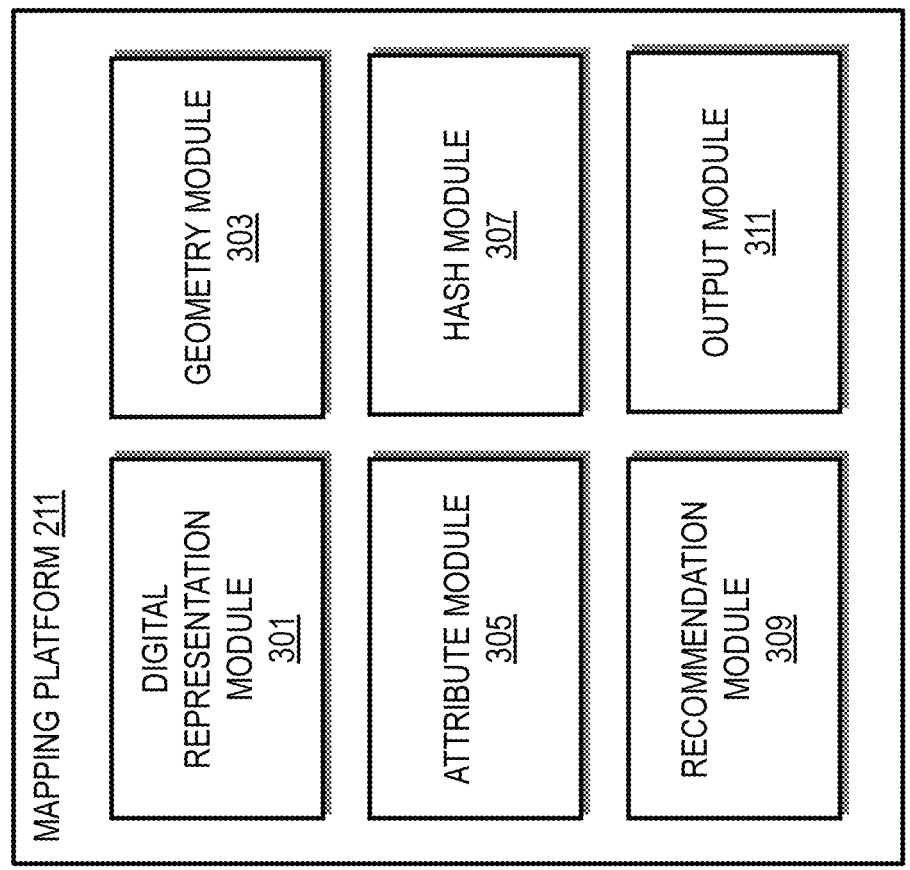
FIG. 3 is a diagram of components of a mapping platform capable of comparing and assimilating cartographic representations, according to one embodiment.

In one embodiment, the system 200 includes the mapping platform 211 for performing the functions associated with comparing and assimilating cartographic representations based on geometry data and attribute data according to the various embodiments described herein. As shown in FIG. 3, in one embodiment, the mapping platform 211 includes one or more components for performing these functions. It is contemplated that the functions of these components may be combined or performed by other components of equivalent functionality. As shown, in one embodiment, the mapping platform 211 includes a digital representation module 301, geometry module 303, attribute module 305, hash module 307, recommendation module 309, and output module 311. The above presented modules and components of the mapping platform 211 can be implemented in hardware, firmware, software, or a combination thereof. Though depicted as a separate entity in FIG. 1, it is contemplated that the mapping platform 211 may be implemented as a module of any of the components of the system 200 (e.g., a component of services platform 221, services 223, content provider 219, etc.). In another embodiment, one or more of the modules 301-311 may be implemented as a cloud-based service, local service, native application, or combination thereof. The functions of the mapping platform 211 and modules 301-311 are discussed with respect to FIGS. 3-7C below.

Figure 4:
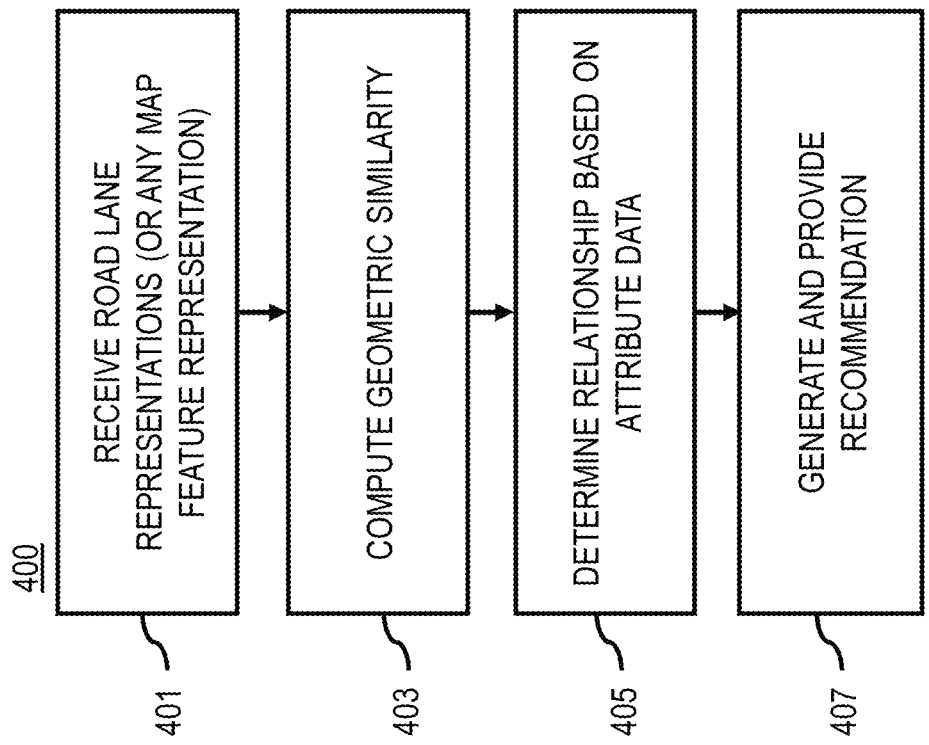
FIG. 4 is a flowchart of a process for comparing and assimilating cartographic representations, according to one embodiment.
Figure 10:
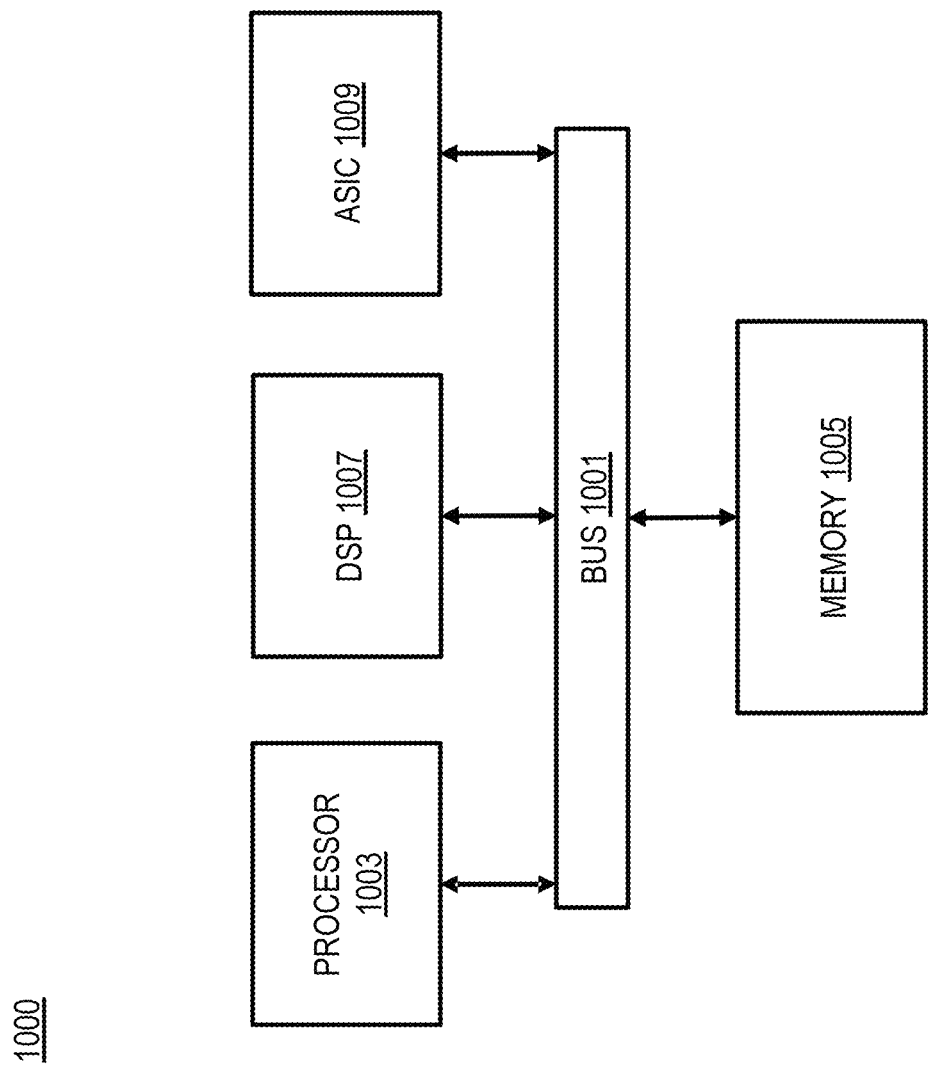
FIG. 10 is a diagram of a chip set that can be used to implement an embodiment.

FIG. 4 is a flowchart of a process for comparing and assimilating cartographic representations, according to one embodiment. In various embodiments, the mapping platform 211 and/or any of the modules 301-311 may perform one or more portions of the process 400 and may be implemented in, for instance, a chip set including a processor and a memory as shown in FIG. 10. As such, the mapping platform 211 and/or any of the modules 301-311 can provide means for accomplishing various parts of the process 400, as well as means for accomplishing embodiments of other processes described herein in conjunction with other components of the system 200. Although the process 400 is illustrated and described as a sequence of steps, it is contemplated that various embodiments of the process 400 may be performed in any order or combination and need not include all of the illustrated steps.

The approach taken by various embodiments of the process 400 to provide a solution to the technical challenges of comparing and assimilating cartographic representations (e.g., road lane representations) is a configurable layered feedback mechanism. For example, the embodiments of the process 400, given two cartographic representations from any two sources or at different times from the same source, in abstraction, helps end user services or applications to automatically determine the relationship between these two cartographic relationships—hence, an assimilation of the cartographic representations.

In one embodiment, the process 400 comprises the following building blocks used to determine the relationship between cartographic:

(1) Check geometric similarity between the cartographic representations;
(2) Identify the relationship between the cartographic representations;
(3) Optionally, generate an identification unique to the geometry and properties/attributes of the cartographic representations to advantageously avoid having to expend additional computation resources when making further comparisons of previously processed cartographic representations (see process 600 of FIG. 6 below); and
(4) Output a recommendation as to what has to be done with either of the cartographic representations, subject to the context.

The building blocks are described in more detail below.

In step 401, the digital representation module 301 receives a first cartographic representation (e.g., a first road lane representation) and a second cartographic representation (e.g., second road lane representation). The cartographic representations, for instance, are any form of digital representation of any cartographic or map feature appearing in a digital map (e.g., the geographic database 217). Examples of cartographic features include but are not limited to road lanes, boundaries of the road lanes, building footprints, political boundaries, terrain features, etc. As described above, the cartographic representations can be received in any format that records both the geometry (e.g., location, shape, structure, etc.) and the attributes (e.g., data describing the non-geometric characteristics or properties such as direction of travel of a lane, traffic speed on a lane, traffic volume on a lane, functional class of a lane, allowed vehicles on a lane, etc.) of a cartographic feature.

For example, the received cartographic representations (e.g., road lanes and/or along with their boundaries) can be defined in a geoJSON format or equivalent and have certain business attributions like direction of travel or other lane attributes attached. In addition, the two cartographic representations under consideration may be received from the same source (e.g., content provider 219) at two different time frames (e.g., at different respective times), or the two cartographic representations under consideration can be received from two different sources (e.g., two different content providers 219).

In step 403, after receiving the two cartographic representations to compare, the geometry module 303 computes a geometric similarity between the first cartographic or road lane representation and the second cartographic or road lane representation. In other words, the geometry module 303 can perform a similarity check between the geometries of the two representations. In one embodiment, the geometry module 303 can determine the geometric similarity based on a distance metric computed between the two representations. The geometry module 303 can then classify the two cartographic representations as geometrically similar based on determining that the distance indicates that the two cartographic representations differ by less than a distance threshold. For example, when comparing road lane representations, the distance threshold can be based on a width, a length, or a combination of a road lane.

In one embodiment, the geometry module 303 can perform the similarity check between cartographic feature (e.g., lane) geometries using a Hausdorff distance as a similarity measure. The Hausdorff distance, for instance, is particularly suitable for evaluating linear geometries such as road lane representations or linear feature of other cartographic representations. For fairly linear parallel curves of significantly the same length, the Hausdorff distance is nearly equal to the parallel displacement between the two curves. As the curves become more complex with increased curvature, convolution, intersections and so on, the Hausdorff distance can deviate from the parallel displacement between the curves, accounting for the differences between the curves. It is noted that the Hausdorff distance is provided by way of illustration and not as a limitation, and it is contemplated that any other type of distance metric can be used in the embodiments described herein. For example, a Fréchet distance or DTW (Dynamic Time Warping) can be used as alternatives.

In one embodiment, the objective of the similarity measure is to detect differences in the given geometries. The geometry module 303 can then regard any distance metric values over a given distance threshold as conclusively non-similar geometries. The geometry module 303 can specify different distance thresholds for different contexts or cartographic features (e.g., comparing the centerline representations of lanes versus comparing the representations of the boundaries of lanes). For example, while comparing two similar looking lane representations on a given road provisioned at different time frames, their center-line geometries are considered where the choice of the similarity threshold can consider various factors such as but not limited to:

Curvature of the lane;
Width of the lane; and
Length of the lane.

In the least complex case, where the center-line geometries of the two road lane representations are equal in length and are parallelly displaced with no shape changes, the two displaced lane representations can be considered similar if the displacement between them is less than the width of the lane.

In one embodiment, the width of the lane depends on whether the lane belongs to a highway, an internal street or if it is a bicycle lane, and so on. Accordingly, a highway would have broader lanes while bicycle lanes would be narrow. In addition, width of the lanes would be only helpful when the lanes are less complex (e.g., if the lanes are parallel), and as they become complex, width becomes less of a determinative factor in setting the distance threshold for determine geometric similarity.

In one embodiment, length of the lane representations in comparison is another factor that the geometry module 303 considers when determining the distance threshold. For lengthy lanes (e.g., lanes above a threshold length), a small deviation would increase the Hausdorff distance but is practically ignorable in the sense that a change in one point should not lead to having to replace the whole geometry and its attributes.

Figure 5A:
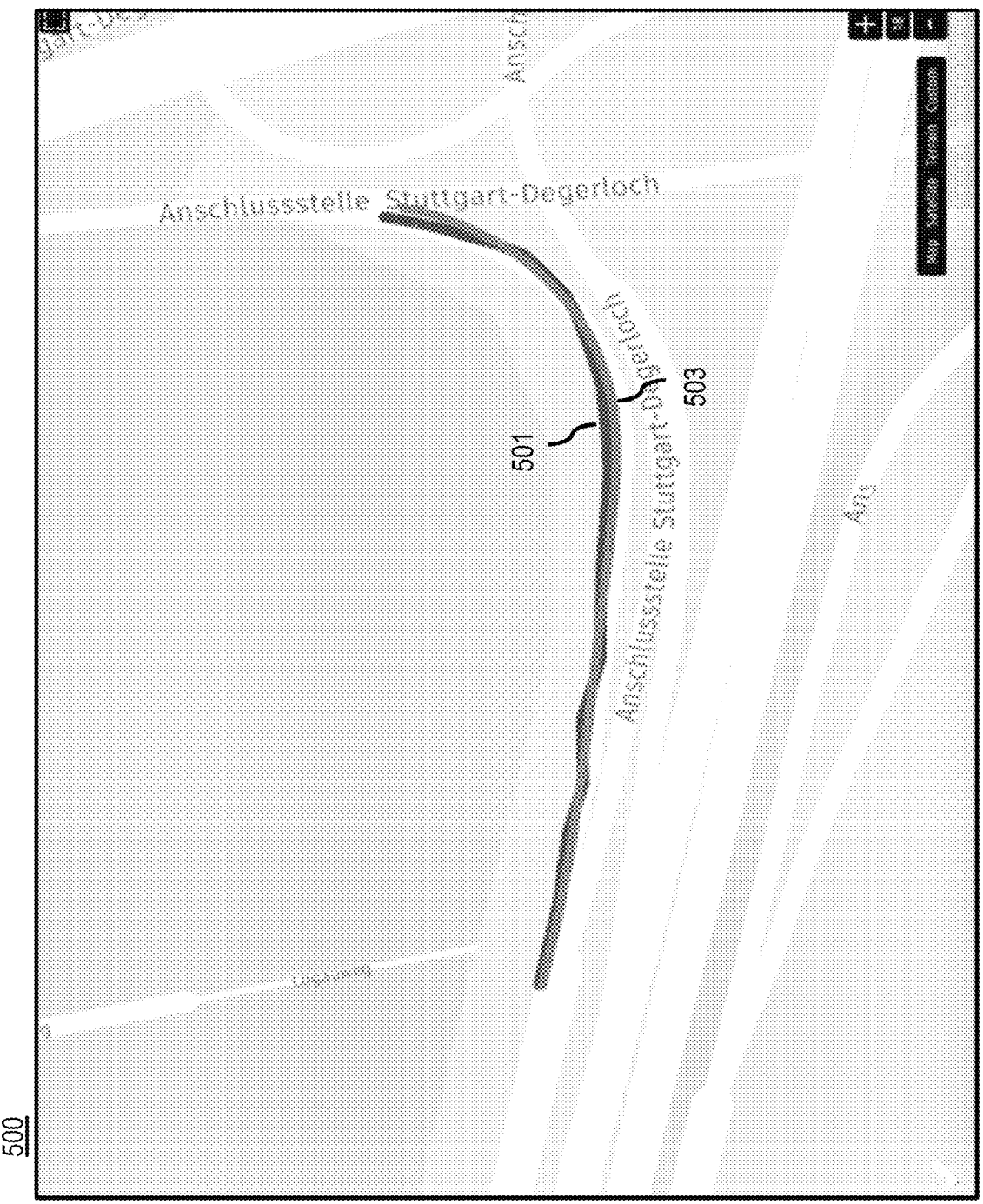
FIGS. 5A-5D is a diagram illustrating example relationships of road lane representations, according to one embodiment.

For example, returning to the example of FIG. 1D which depicts two overlapping road lane representations 161 and 163, the calculated Hausdorff distance between the centerlines of lane representations 161 and 163 is 1.54195235 meters. Applying a distance threshold on a typical width of a highway lane (e.g., 3.8 m), the geometry module 303 can classify the lane representations 161 and 163 as geometrically similar. FIG. 5A depicts another example in which a mapping user interface 500 visualizes road lane representations 501 and 503 that also generally overlap. In this example, the two fairly similar centerline geometries of lane representations 501 and 503 with minor differences results in a computed Hausdorff distance of 6.84125608 meters. Even though the Hausdorff distance is relatively big (e.g., greater than the width-based distance threshold of 3.8 meters), suggesting that these two lane representations 501 and 503 represent two different lanes based on their geometric similarity, it can be seen that these are two representations 501 an 503 of the same lane at different points in time. This indicates geometric similarity or distance alone may not be a reliable deciding factor.

To address this issue, in step 405, the attribute module 305 supplements the geometric similarity data by processing attribute data associated with the two cartographic representations being compared to identify and represent the relationship between the two cartographic representations. In one embodiment, after ruling out comparing geometries that are significantly far from each other (e.g., have distance metric values greater than the distance threshold as described in step 403 above, an multiple of that distance threshold, or a separately designated threshold), the attribute module 305 can perform an analysis to gather information about the spatial relationship between the geometries of the two cartographic representations based on their attributes. The determined relationship can then be represented to help the downstream systems.

In one embodiment, with respect to comparing road lane representations, the attribute module 305 can use a predicated representation for intersections associated with the road lane representations. In other words, the identification of the relationship between the road lane representations is predicated on an aggregation of information about the intersection aspect of the two representations. For this aggregation can be juxtaposed as a sequence of digits 1 and 0, which subject to their position in the predicate give a binary representation of an intersection condition (e.g., 1=intersection at the position, and 0=no intersection at the position). By way of example, the fulfilment of an intersection condition can decided in accordance with the DE-9IM model (Dimensionally Extended nine-Intersection model) and/or any other specified custom criteria.

In one embodiment, the attribute module 305 can use the attribute data to determine business driven relationships between the two cartographic representations being compared. Once a geometrical relationship is established between the two representations (e.g., according to step 403 above), the attributes associated with the lanes could be used to further refine the relationship. These attributes can be, for instance, business attributes specified based on the needs of an end user of the cartographic data. For example, for navigation and mapping businesses, services, and/or applications, business attributes can include but are not limited to direction of travel on a lane, traffic speed on a lane, traffic volume on a lane, vehicles allowed on a lane, etc. In one embodiment, the attribute module 305 can designate one of the available attributes as a deterministic relationship identifier. For example, the attribute module 305 can designate direction of travel on a lane as a deterministic relationship identifier when comparing two road lane representations. This would mean that a relationship cannot be established between the two lane representations if their respective directions of travel are opposite to each other. In this way, even if two lane representations overlap to an extent where they meet the threshold for being classified as geometrically similar, they would be not classified as the same lane if their directions of travel are in opposite directions. It is noted that direction of travel is provided only as one example of a deterministic relationship identifier. Depending on varying business needs or the type of cartographic representation, there could be other business attributes which could be used further.

In one embodiment, the attribute module 305 can generate realistic and clear nomenclature for describing any determined relationship between the two cartographic representation. The nomenclature can be based on specific conditions such as but not limited to percentage of overlap between geometries of the two representations (e.g., overlap between two road lane representations at their centerlines), a maximum forking distance, and parallel and longitudinal displacement thresholds can facilitate fine identification of the relationships between the geometries. Hence, the nomenclature needs to be a clear representation of the semantic relationship between the two geometries. For example, nomenclatures like "Lane Within Lane", "Displacement Within Threshold", "Displacement Over Threshold", "Similar", "Forked Within Threshold", and so on, allow for a clear demarcation. In one embodiment, the attribute module 305 can deduce these relationships from the predicates and business conditions as mentioned above. Similar to the relationships, choice of thresholds for displacement tolerance, forking and stretch is also subject to use-case specific context.

Figure 5C:
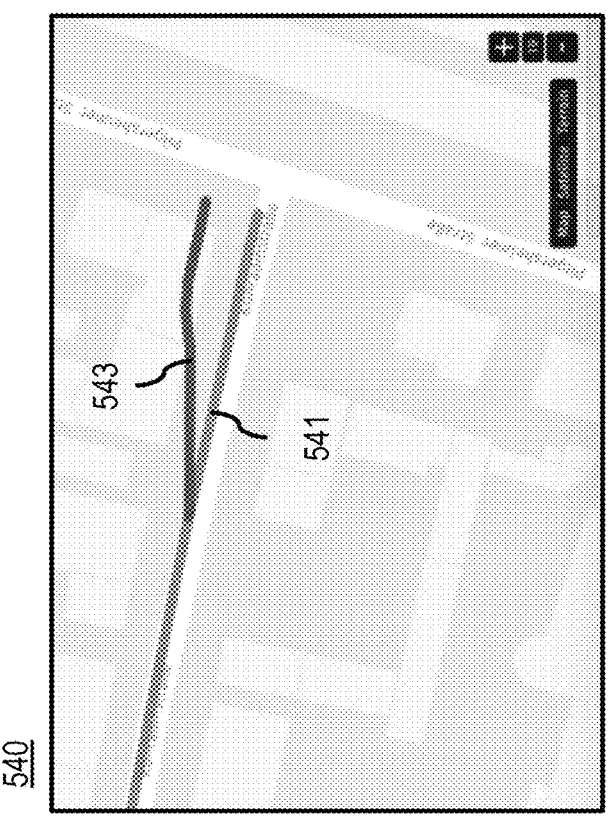
Figure 5B:
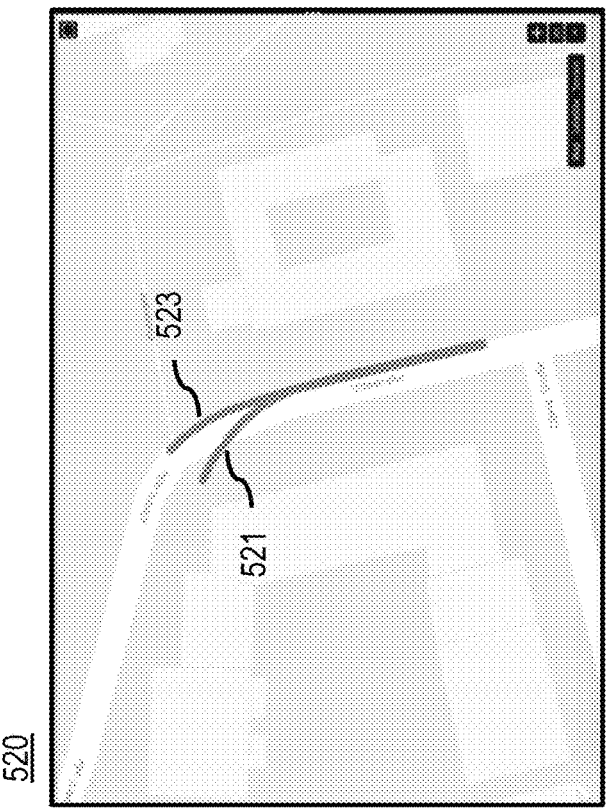

FIG. 5B illustrates a mapping user interface 520 visualizing to road lane representations 521 and 523 received from the same source at different points of time. In this example, the two road lane representations 521 and can be observed to be overlapping for the most part but deviating towards the end. It can be determined from visual inspection that the two road lane representations 521 and 523 represent the same lane, especially considering that the attributes of the two road lane representations also match (e.g., directions of travel are the same). However, considering that the Hausdorff distance between the lane representations 521 and 523 is greater than the width of a lane, applying a distance threshold based on the width of the lane to check for geometric similarity would not help to reach the same conclusion. However, identification of the spatial relationship between the lane representations 521 and 523 as described in the embodiments above can lead to determining that that lane representations 521 and 523 have a relationship described with the designated nomenclature "FORKED WITHIN THRESHOLD".

Figure 5D:
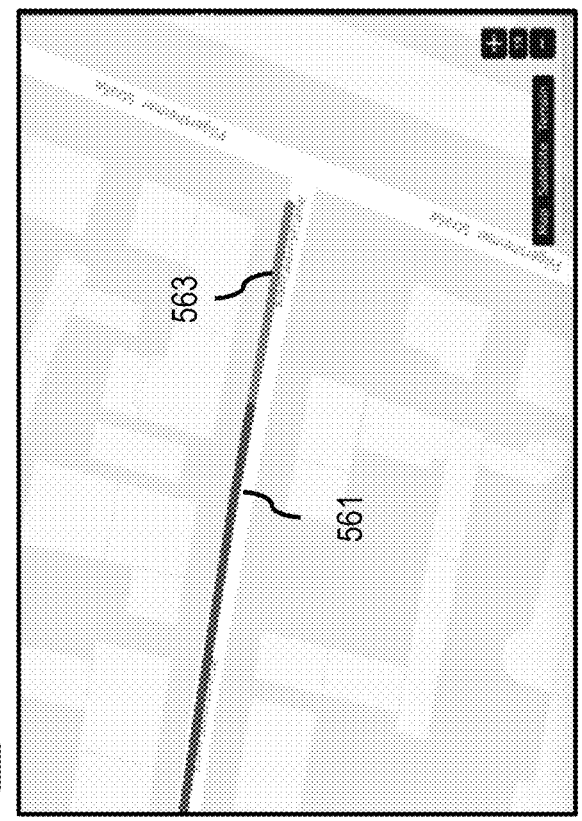
Figure 6:
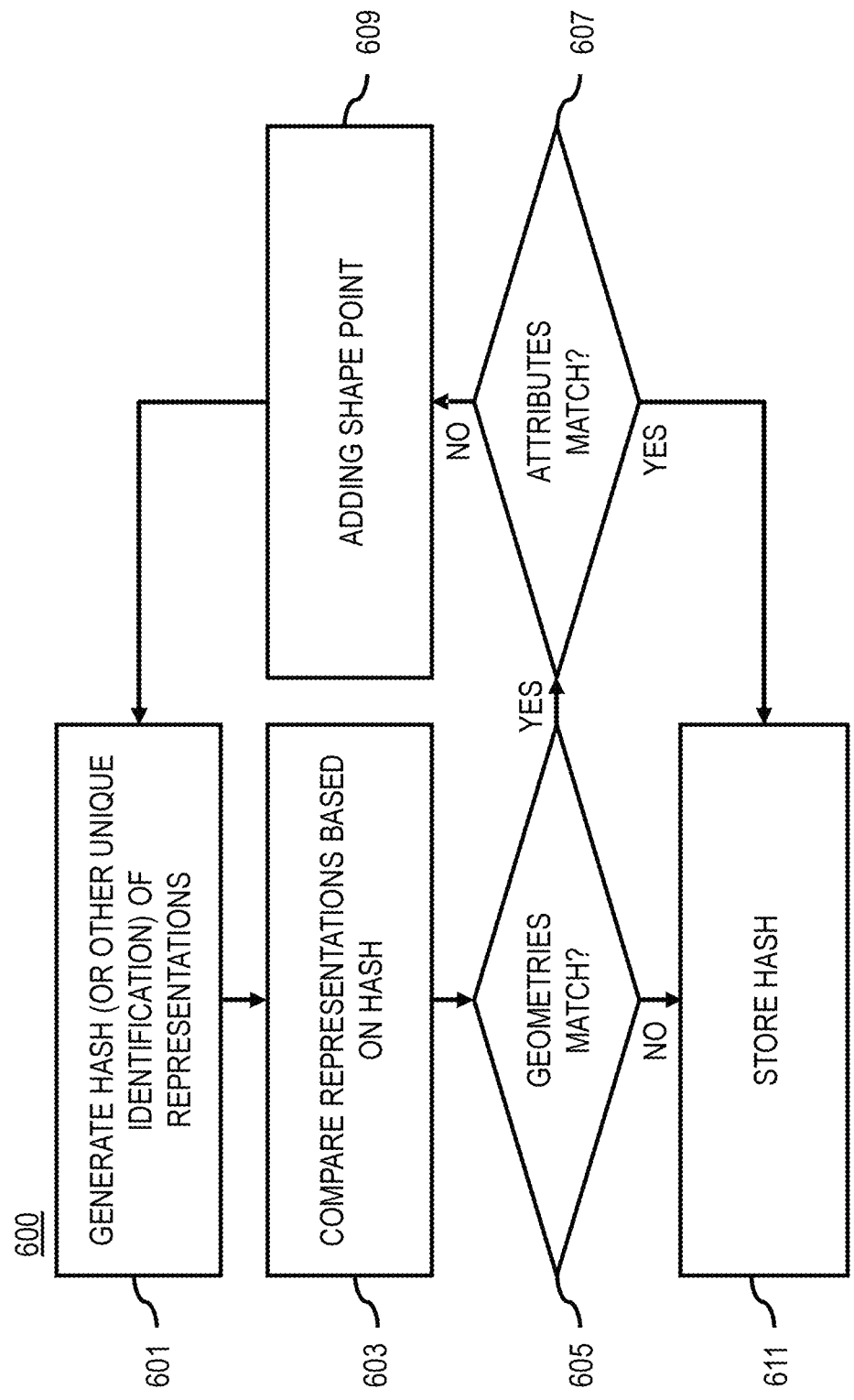
FIG. 6 is a flowchart of a process for generating a unique identification (e.g., a hash) of cartographic representations, according to one embodiment.

FIG. 5C illustrates a mapping user interface 540 visualizing lane representations 541 and 543 whose two centerline geometries meet the criteria for classifying them as exhibiting the relationship "LANE FORMING". FIG. 5D illustrates a mapping user interface 560 visualizing lane representations 561 and 563 whose centerline geometries meet the criteria for classifying them as exhibiting the relationship "LANE WITHIN LANE". Finally, returning to the example of FIG. 1E, the lane representations 181 and 183 meet the criteria for classifying them as exhibiting the relationship "SHOULDER LANE".

Following evaluation of the geometric similarity (according to step 403) and attribute-based relationships (according to step 405), the hash module can optionally calculate a unique identification of the cartographic representations being compared based on their respective geometries and attributes/properties. This process is described in more detail with respect to FIG. 6 which is a flowchart of a process 600 for generating a unique identification (e.g., a hash) of cartographic representations, according to one embodiment. In various embodiments, the mapping platform 211 and/or any of the modules 301-311 may perform one or more portions of the process 600 and may be implemented in, for instance, a chip set including a processor and a memory as shown in FIG. 10. As such, the mapping platform 211 and/or any of the modules 301-311 can provide means for accomplishing various parts of the process 600, as well as means for accomplishing embodiments of other processes described herein in conjunction with other components of the system 200. Although the process 600 is illustrated and described as a sequence of steps, it is contemplated that various embodiments of the process 600 may be performed in any order or combination and need not include all of the illustrated steps.

Having to perform the processes associated with checking geometric similarity and determining relationships based on attributes every time to compare multiple representations can be computer resource intensive and redundant particularly when one or more of the representations have been previously processed and compared. For example, if a certain fixed cartographic representation (e.g., one road lane representation) may have to be compared to other representations, reprocessing the geometric and attribute data for the fixed representation can be redundant and unnecessary. To avoid this redundancy and advantageously reduce computer resource usage, the hash module 307 can generate a one-time value (e.g., a hash value using any hash function) which identifies the geometry of a cartographic representation along with its attributes (e.g., business function) (step 601). This can be calculated based on a hash of the functional attribute/property values along with the information of the geometry of each cartographic representation.

Generally, the functional properties or attribute data are consistent among all entities to be compared whereas the geometry is not. Hence, having hash value based on the same posed significant technical challenges. Considering the geospatial coordinates of cartographic representations, inconsistencies in similar geometries take numerous forms such as, but not limited to, an extra shape point, precision of the points in the geometry and so on. Hence, the hash module 307 uses a layered approach of generating identification by hashing.

In one embodiment, the hash module 307 methodology considers that the shape points vary across linestrings of a cartographic representation, but they generally have boundary points (the start and the end point) that are relatively consistent. Hence for the first layer of generating a hash, functional properties of the lane along with the boundary points of the linestring are considered and used to generate a hash. After generating a hash for each cartographic representation, the hash module 307 compares the representations based on the hash (step 603). In one embodiment, the generating of the hash comprises generating a separate geometric hash based on the geometries of the representations and a separate attribute hash for the attributes of functional properties of the representations. In other words, the hash includes a geometric hash calculated from the geometry data and an attribute hash calculated from the attribute data. The hash module 307 then compares the geometries (step 605) and the attributes (step 607) encoded in the hash.

If the generated hashes of the geometries in comparison are the same, but the semantic relationship between them suggests otherwise, then another round of hash generation can be done, adding their shape points (step 609). In other words, the hash module 307 determines that the subsequent comparison indicates that the geometries encoded in the hash match within a geometric matching threshold and that the attributes encoded in the hash do not match within an attribute matching threshold, and then recalculates the hash by including at least one additional shape point from the representations. It is implied that the hash values generated would be different because the information about the difference in their spatial arrangement and shape should be accounted for by the difference in their shape points.

In step 611, the resultant hash can be stored as an attribute within the respective cartographic representation (e.g., geoJSON representation), so the next time this geometry has to be compared with another, all it takes is follow the embodiments of the process 600 to create a hash for the new geometry, if it does not have one already, and then comparing them.

Returning to step 407 of FIG. 4, after processing the geometry data and attribute data of the cartographic representations being compared and optionally generating respective hashes, the recommendation module 309 generate a recommendation with respect to assimilating the cartographic representations based on the geometric similarity and the attribute data (e.g., the relationship between the representations determined from their respective attributes).

In one embodiment, instead of making any decisions from itself for the two input cartographic representations, the output module 311 can provide the recommendation as an output to downstream systems. For example, the output module 311 can provision the complete analysis of the relationship of the cartographic representations which is determined through above processes. Accordingly, the downstream systems, based on the analysis, could make the related decisions regarding assimilating the representations accordingly.

In one embodiment, the recommendation for the cartographic representations (e.g., road lane representations) when comparing representations can fall under categories such as but not limited to:

The cartographic representations are completely disparate;

The cartographic representations are exactly same (and hence the same hash value is returned); and The cartographic representations are similar but with varying nomenclature of similarity relationships such as but not limited to "Displacement Within Threshold", "Displacement Over Threshold", "Forked with Threshold", "Lane Forming", "Lane within Lane", etc. as described above.

In one embodiment, the downstream system (e.g., the services platform 221 and/or any of the services 223), can apply downstream-specific contexts to make appropriate decisions to either ignore the new lane or cartographic representation, or merge the two similar cartographic representations, or replace the existing cartographic representation with the new cartographic representation. Alternatively, if the cartographic data (e.g., the geographic database 217 is under the control of the mapping platform 211), the output module 311 can automatically initiate an assimilation of the compared cartographic representations based on the determined assimilation recommendation to either ignore, merge, or replace one or more of the cartographic representations in the digital map data.

In embodiments where the cartographic representation is a centerline or other approximation of a cartographic feature that includes related boundary representations (e.g., a road lane representation with corresponding representations of the boundaries of the road lane), the mapping platform 211 can extend the comparison process from the centerline to their boundaries. For example, the when comparing cartographic representations with associated boundary features (e.g., road lanes and their boundaries), the mapping platform 211 can consider centerline road lane representations as well as the representations of the lane boundaries on either side as centerline as independent features respectively for both given lanes in the input. Accordingly, the embodiments of the process 400 used to establish lane relationships using lane centerlines as described above could also be applied for boundaries as well. The relationship analysis between boundary features would help strengthen the accuracy aspects for the lanes.

In other words, the mapping platform 211 can determining a first road boundary representation associated with the first road lane representation and a second road boundary representation associated with the second road lane representation. The mapping platform 211 computes a boundary geometric similarity between the first road boundary representation and the second road boundary representation. The mapping platform 211 then processes boundary attribute data associated with the first road boundary representation and the second road boundary representation to determine a boundary semantic relationship between the first lane representation. The assimilation recommendation for the main or original representations being compared can then be based on the boundary geometric similarity the bound semantic relationship. It is noted that for boundary features, the associated set of attributes or functional properties used to determine the semantic relationship (or the nomenclature of the relationship itself) can differ from those used to compare the original representations. For example, markings on the boundaries (as opposed to direction of travel) could be a determinative factor based on the business needs.

Figure 7A:
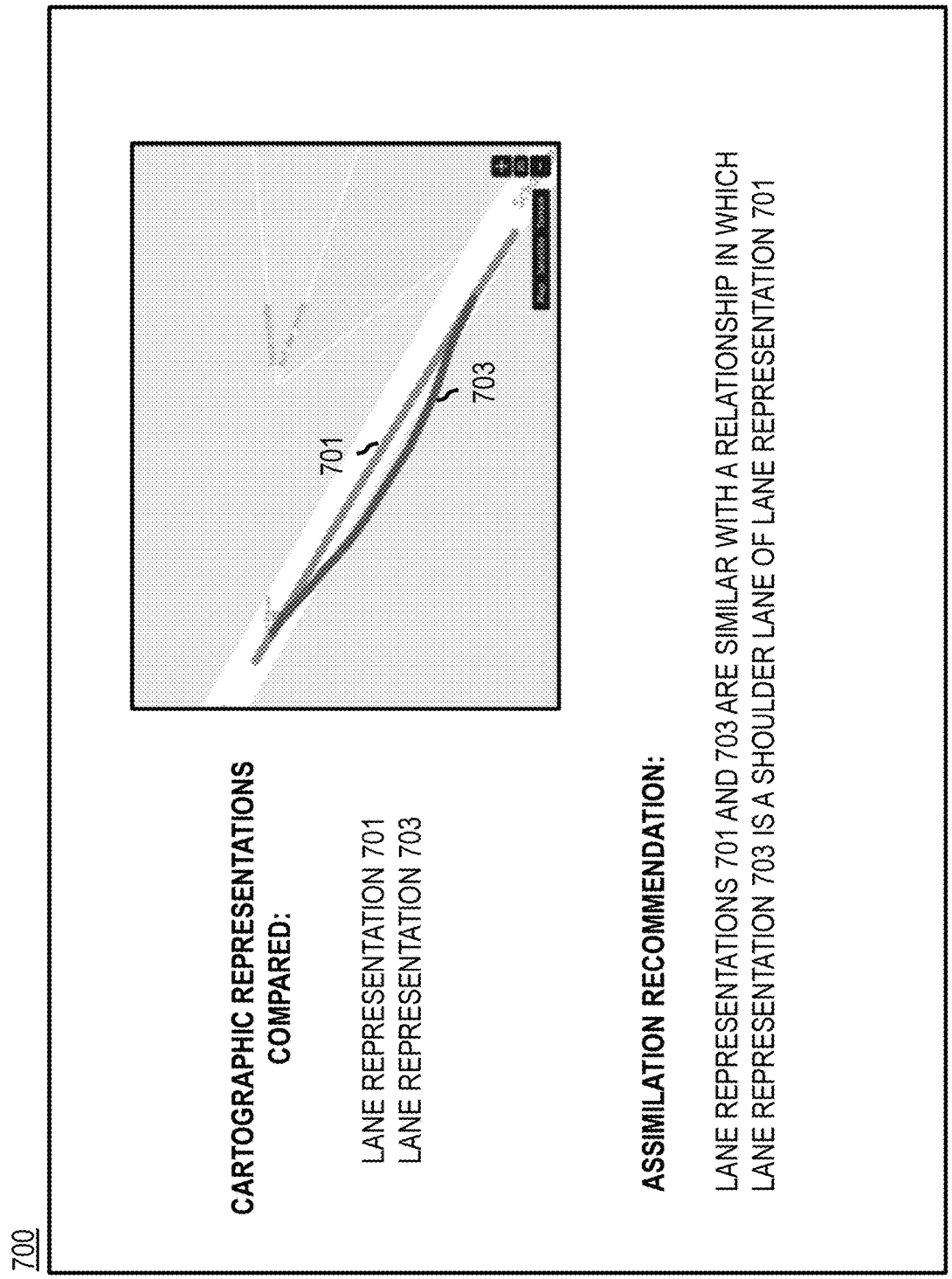

As described above, the assimilation recommendation, comparison analysis, determined relationships, and/or any other related information can be provided as an output to downstream systems, services, applications, etc. FIG. 7A illustrates an example user interface (UI) 700 that displays the output generated based on comparing lane representations 701 and 703 according to the embodiments described herein. In this example, the UI 700 lists the cartographic representations being compared as lane representation 701 and lane representation 703 and provides a visualization of the representations 701 and 703. The UI also provides the results of the analysis as an assimilation recommendation that states, "Lane representations 701 and 703 are similar in which lane representation 703 is a shoulder lane of lane representation 702". It is then up the system receiving the output to determine what action to take with respect to the recommendation and relationship information. For example, if the receiving system does not track shoulder lanes, the system can simply ignore the lane representation 703. On the other hand, if shoulder lanes are tracked by the receiving system, then the system can add the lane representation 703 as a new shoulder lane if it has not already been stored in the system. Thus, the receiving system has the flexibility to make a final decision with respect to the assimilation recommendation that is suited to its particular context or business needs.

Figure 7C:
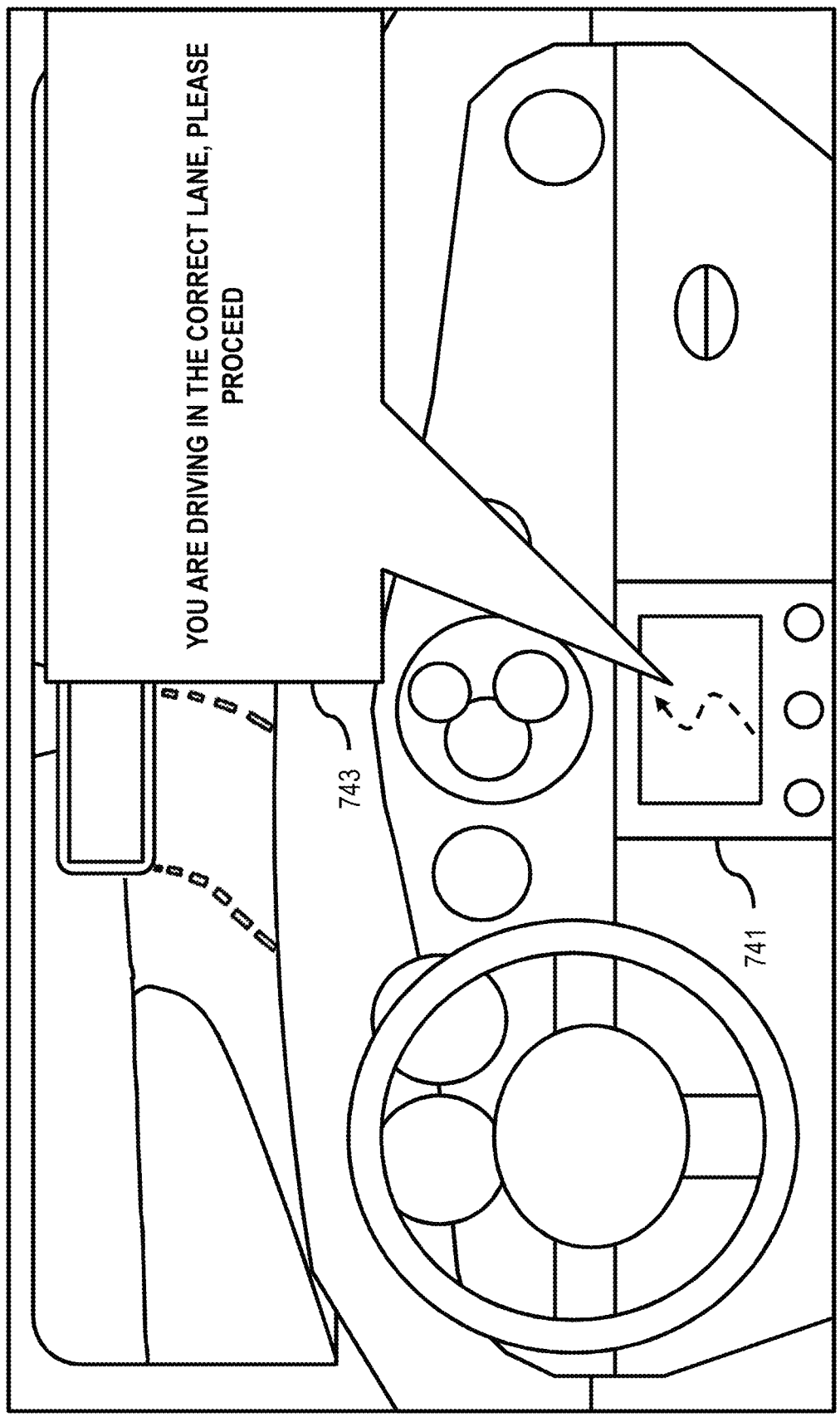

FIGS. 7B and 7C illustrate an example of using embodiments described herein in a real-time scenario. In this example, a vehicle is driving on a lane 721 of a road and uses its onboard sensor system (e.g., a camera system, positioning sensors, etc.) to capture sensor data (e.g., an image 723 and associated location data) of the road lane. The vehicle can process the image 723 using object recognition or equivalent image processing techniques to construct a road lane representation 725 of the centerline of the road lane (e.g., in geoJSON format) and add attributes such as a direction of travel (e.g., based on a compass heading or pointing direction of the vehicle). In addition, the vehicle can process the image 723 to determine the boundaries of the road lane and construct respective boundary representations 727a and 727b. Attributes such as the type of lane marking of the boundaries (e.g., a solid line) can also be added to the representation.

The vehicle can then send the lane representation 725 and boundary representations 727a-727b to the mapping platform 211 for comparison against existing cartographic representations that are within a threshold distance of representations 725, 727a, and 727b. The vehicle can then receive the results of the comparison from mapping platform 211 and then use the assimilation recommendation to determine whether the vehicle is driving in expected lane. For example, if the mapping platform 211 determines that the lane representation 725 generated by the vehicle matches or is the same as a known lane representation (e.g., mapped in the geographic database 217), then the vehicle can confirm to the driver that the vehicle is in the correct lane. For example, as shown in FIG. 7C, an onboard system 741 of the vehicle can present a message 743 that informs the driver "You are driving in the correct lane, please proceed".

Returning to FIG. 1, in one embodiment, the mapping platform 211 has connectivity over the communication network 213 to the services platform 221 that provides one or more services 223. By way of example, the services 223 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. that can receive output generated by the mapping platform 211 based on comparing and assimilating cartographic representations. In one embodiment, the services platform 221 uses the output (e.g. assimilation recommendations and related information) of the mapping platform 211 to provide services such as navigation, mapping, other location-based services, etc.

In one embodiment, the mapping platform 211 may be a platform with multiple interconnected components. The mapping platform 211 may include multiple servers, intelligent networking devices, computing devices, components and corresponding software for providing parametric representations of lane lines. In addition, it is noted that the mapping platform 211 may be a separate entity of the system 200, a part of the services platform 221, a part of the one or more services 223, or included within the vehicles 201 (e.g., an embedded navigation system).

In one embodiment, content providers 219 may provide content or data (e.g., cartographic representations etc.) to the mapping platform 211, the UEs 205, the geographic database 217, the services platform 221, the services 223, and the vehicles 201. The content provided may be any type of content, such as map content, textual content, audio content, video content, image content, etc. In one embodiment, the content providers 219 may provide content that may aid in localizing a vehicle path or trajectory on a lane of a digital map or link. In one embodiment, the content providers 219 may also store content associated with the mapping platform 211, the probe database 215, the geographic database 217, the services platform 221, the services 223, and/or the vehicles 201. In another embodiment, the content providers 219 may manage access to a central repository of data, and offer a consistent, standard interface to data, such as a repository of the geographic database 217.

By way of example, the UEs 205 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 205 can support any type of interface to the user (such as "wearable" circuitry, etc.). In one embodiment, a UE 205 may be associated with a vehicle 201 (e.g., a mobile device) or be a component part of the vehicle 201 (e.g., an embedded navigation system). In one embodiment, the UEs 205 may include the mapping platform 211 to detect lane-level dangerous slowdown events based on probe data and/or sensor data.

In one embodiment, as mentioned above, the vehicles 201, for instance, are part of a probe-based system for collecting probe data and/or sensor data for detecting traffic incidents (e.g., dangerous slowdown events) and/or measuring traffic conditions in a road network. In one embodiment, each vehicle 201 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 201 may include sensors 203 for reporting measuring and/or reporting attributes. The attributes can also be any attribute normally collected by an on-board diagnostic (OBD) system of the vehicle 201, and available through an interface to the OBD system (e.g., OBD II interface or other similar interface).

The probe points can be reported from the vehicles 201 in real-time, in batches, continuously, or at any other frequency requested by the system 200 over, for instance, the communication network 213 for processing by the mapping platform 211 to generate cartographic representations of various map features. The probe points also can be map matched to specific road links stored in the geographic database 217. In one embodiment, the system 200 (e.g., via the mapping platform 211) can generate probe traces (e.g., vehicle paths or trajectories) from the probe points for an individual probe so that the probe traces represent a travel trajectory or vehicle path of the probe through the road network.

In one embodiment, as previously stated, the vehicles 201 are configured with various sensors (e.g., vehicle sensors 203) for generating or collecting probe data, sensor data, related geographic/map data, etc. In one embodiment, the sensed data represents sensor data associated with a geographic location or coordinates at which the sensor data was collected. In one embodiment, the probe data (e.g., stored in the probe database 215) includes location probes collected by one or more vehicle sensors 203. By way of example, the vehicle sensors 203 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 201, switch sensors for determining whether one or more vehicle switches are engaged, and the like. Though depicted as automobiles, it is contemplated the vehicles 201 can be any type of vehicle manned or unmanned (e.g., cars, trucks, buses, vans, motorcycles, scooters, drones, etc.) that travel through road segments of a road network.

Other examples of sensors 203 of the vehicle 201 may include light sensors, orientation sensors augmented with height sensors and acceleration sensor (e.g., an accelerometer can measure acceleration and can be used to determine orientation of the vehicle), tilt sensors to detect the degree of incline or decline of the vehicle 201 along a path of travel (e.g., while on a hill or a cliff 303), moisture sensors, pressure sensors, etc. In a further example embodiment, sensors 203 about the perimeter of the vehicle 201 may detect the relative distance of the vehicle 201 from a physical divider, a lane line of a link or roadway, the presence of other vehicles, pedestrians, traffic lights, potholes and any other objects, or a combination thereof. In one scenario, the vehicle sensors 203 may detect weather data, traffic information, or a combination thereof. In one embodiment, the vehicles 201 may include GPS or other satellite-based receivers 203 to obtain geographic coordinates from satellites 209 for determining current location and time. Further, the location can be determined by visual odometry, triangulation systems such as A-GPS, Cell of Origin, or other location extrapolation technologies.

In one embodiment, the UEs 205 may also be configured with various sensors (not shown for illustrative convenience) for acquiring and/or generating probe data and/or sensor data associated with a vehicle 201, a driver, other vehicles, conditions regarding the driving environment or roadway, etc. For example, such sensors may be used as GPS receivers for interacting with the one or more satellites 209 to determine and track the current speed, position and location of a vehicle 201 travelling along a link or roadway. In addition, the sensors may gather tilt data (e.g., a degree of incline or decline of the vehicle during travel), motion data, light data, sound data, image data, weather data, temporal data and other data associated with the vehicles 201 and/or UEs 205. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via communication network 213 as probe data (e.g., GPS probe data) according to any known wireless communication protocols. For example, each UE 205, application 111, user, and/or vehicle 201 may be assigned a unique probe identifier (probe ID) for use in reporting or transmitting said probe data collected by the vehicles 201 and/or UEs 205. In one embodiment, each vehicle 201 and/or UE 205 is configured to report probe data as probe points, which are individual data records collected at a point in time that records telemetry data.

In one embodiment, the mapping platform 211 retrieves aggregated probe points gathered and/or generated by the vehicle sensors 203 and/or the UE 205 resulting from the travel of the UEs 205 and/or vehicles 201 on a road segment of a road network. In one instance, the probe database 215 stores a plurality of probe points and/or trajectories generated by different vehicle sensors 203, UEs 205, applications 111, vehicles 201, etc. over a period while traveling in a monitored area. A time sequence of probe points specifies a trajectory—i.e., a path traversed by a UE 205, application 111, vehicle 201, etc. over the period.

In one embodiment, the communication network 213 of the system 200 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 201, vehicle sensors 203, mapping platform 211, UEs 205, applications 111, services platform 221, services 223, content providers 219, and/or satellites 209 communicate with each other and other components of the system 200 using well known, new or still developing protocols. In this context, a protocol includes a set of rules defining how the network nodes within the communication network 213 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
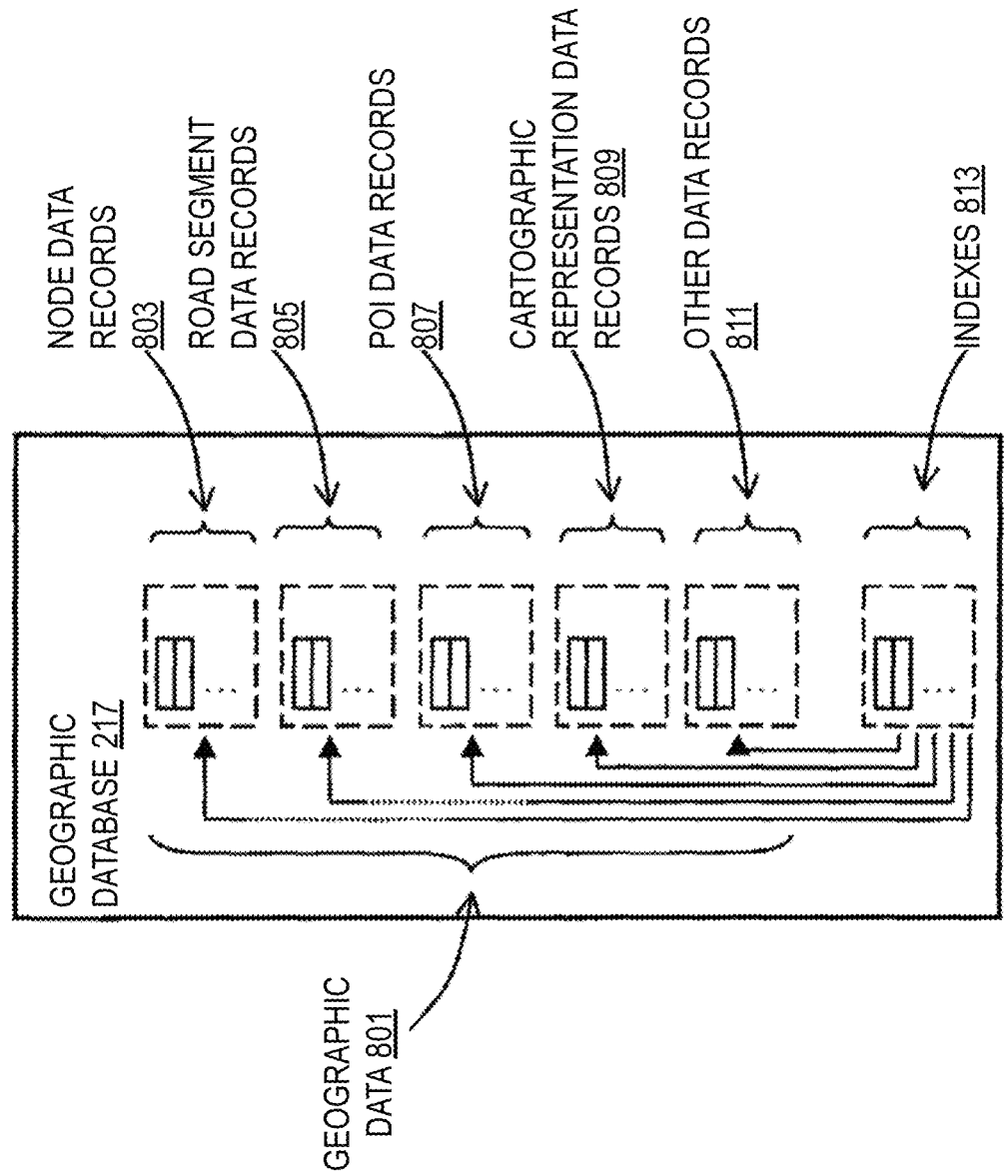
FIG. 8 is a diagram of a geographic database, according to one embodiment.

FIG. 8 is a diagram of a geographic database, according to one embodiment. In exemplary embodiments, probe data can be stored, associated with, and/or linked to the geographic database 217 or data thereof. In one embodiment, the geographic database 217 includes geographic data 801 used for (or configured to be compiled to be used for) mapping and/or navigation-related services, such as for personalized route determination, according to one embodiment. For example, the geographic database 217 includes node data records 803, road segment or link data records 805, POI data records 807, cartographic representation data records 809, other data records 811, and indexes 813. More, fewer or different data records can be provided. In one embodiment, the other data records 811 include cartographic ("cartel") data records, routing data, and maneuver data. In one embodiment, the probe data (e.g., collected from vehicles 201) can be map-matched to respective map or geographic records via position or GPS data associations (such as using known or future map matching or geo-coding techniques), for example. In one embodiment, the indexes 813 may improve the speed of data retrieval operations in the geographic database 217. The indexes 813 may be used to quickly locate data without having to search every row in the geographic database 217 every time it is accessed.

In various embodiments, the road segment data records 805 are links or segments representing roads, streets, paths, or lanes within multi-lane roads/streets/paths as can be used in the calculated route or recorded route information for determination of one or more personalized routes, according to exemplary embodiments. The node data records 803 are end points corresponding to the respective links or segments of the road segment data records 805. The road segment data records 805 and the node data records 803 represent a road network, such as used by vehicles, cars, and/or other entities. Alternatively, the geographic database 217 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, lane number, and other navigation related attributes, as well as POIs, such as gasoline stations, hotels, restaurants, museums, stadiums, offices, automobile dealerships, auto repair shops, buildings, stores, parks, etc. The geographic database 217 can include data about the POIs and their respective locations in the POI data records 807. The geographic database 217 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position within a city).

In one embodiment, the geographic database 217 can cartographic representation data records 809 which store data related to comparing and assimilating cartographic representations based on geometry and attribute data according to the embodiments described herein. For example, the data records 809 can store the representation being analyzed, assimilation recommendations, determined relationships, relationship nomenclature and associated criteria for applying terms in the nomenclature, generated unique identifications (e.g., hashes), and/or any other related data.

The geographic database 217 can be maintained by a content provider 219 in association with the services platform 221 (e.g., a map developer). The map developer can collect geographic data to generate and enhance the geographic database 217. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In one embodiment, the data can include incident reports which can then be designated as ground truths for training a machine learning classifier to classify a traffic from probe data. Different sources of the incident report can be treated differently. For example, incident reports from municipal sources and field personnel can be treated as ground truths, while crowd-sourced reports originating from the general public may be excluded as ground truths.

The geographic database 217 can be a master geographic database stored in a format that facilitates updating, maintenance, and development. For example, the master geographic database 217 or data in the master geographic database 217 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 205, for example. The navigation-related functions can correspond to vehicle navigation, pedestrian navigation, or other types of navigation. The compilation of the mapping and/or probe data to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 217 can be a master geographic database, but in alternate embodiments, the geographic database 217 can represent a compiled navigation database that can be used in or with end user devices (e.g., UEs 205) to provide navigation-related functions. For example, the geographic database 217 can be used with the end user device UE 205 to provide an end user with navigation features. In such a case, the geographic database 217 can be downloaded or stored on the end user device UE 205, such as in applications 111, or the end user device UE 205 can access the geographic database 217 through a wireless or wired connection (such as via a server and/or the communication network 213), for example.

The processes described herein for comparing and assimilating road lane representations using geospatial data and spatial data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
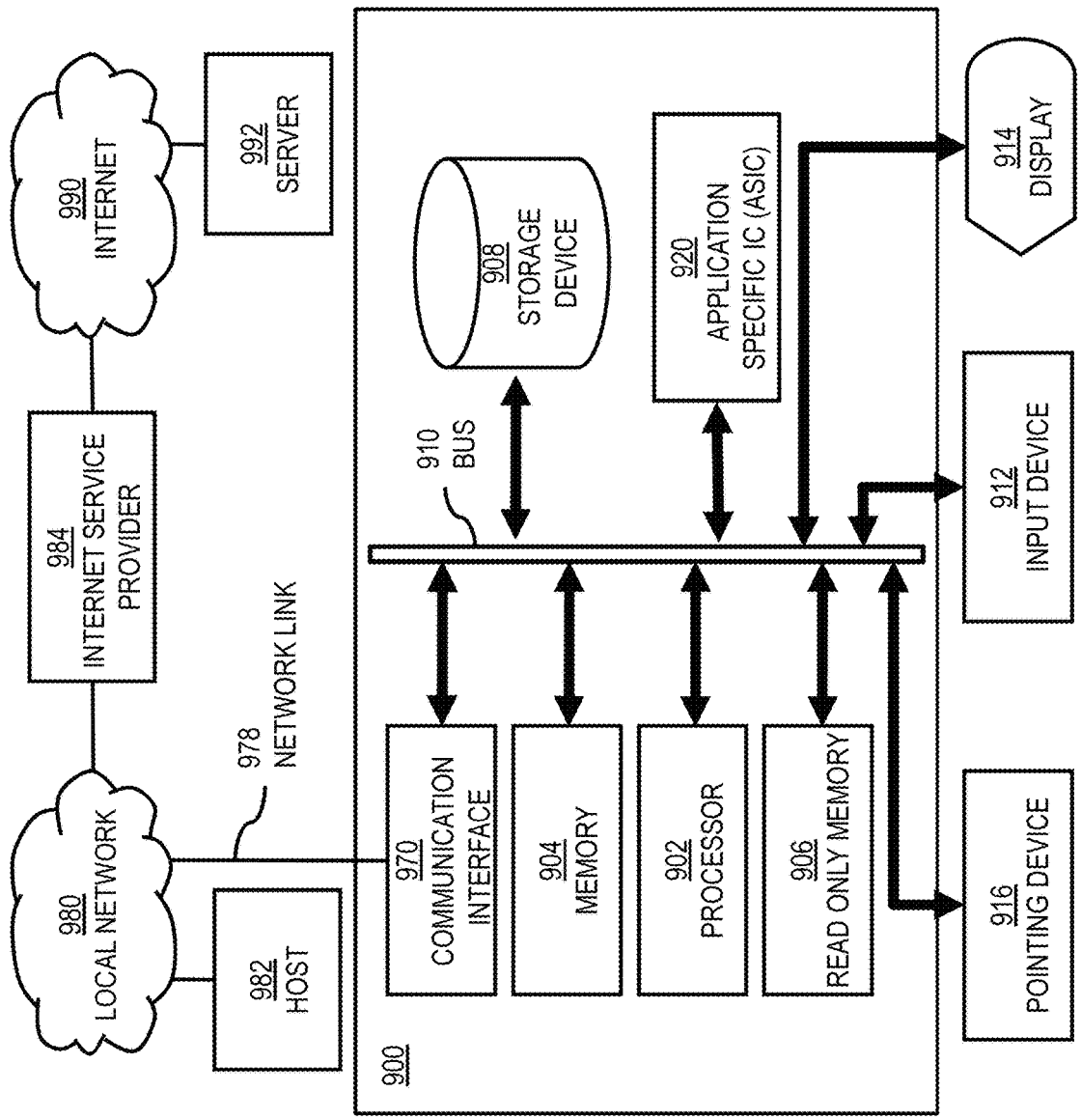
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to compare and assimilate road lane representations using geospatial data and spatial data as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to comparing and assimilating road lane representations using geospatial data and spatial data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for comparing and assimilating road lane representations using geospatial data and spatial data. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for comparing and assimilating cartographic representations (e.g., road lanes) using geospatial data and attribute data, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 213 for comparing and assimilating cartographic representations (e.g., road lanes) using geospatial data and attribute data.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

FIG. 10 illustrates a chip set 1000 upon which an embodiment of the invention may be implemented. Chip set 1000 is programmed to compare and assimilate cartographic representations (e.g., road lanes) using geospatial data and attribute data as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to compare and assimilate cartographic representations (e.g., road lanes) using geospatial data and attribute data. The memory 1005 also stores the data associated with or generated by the execution of the inventive steps.

Figure 11:
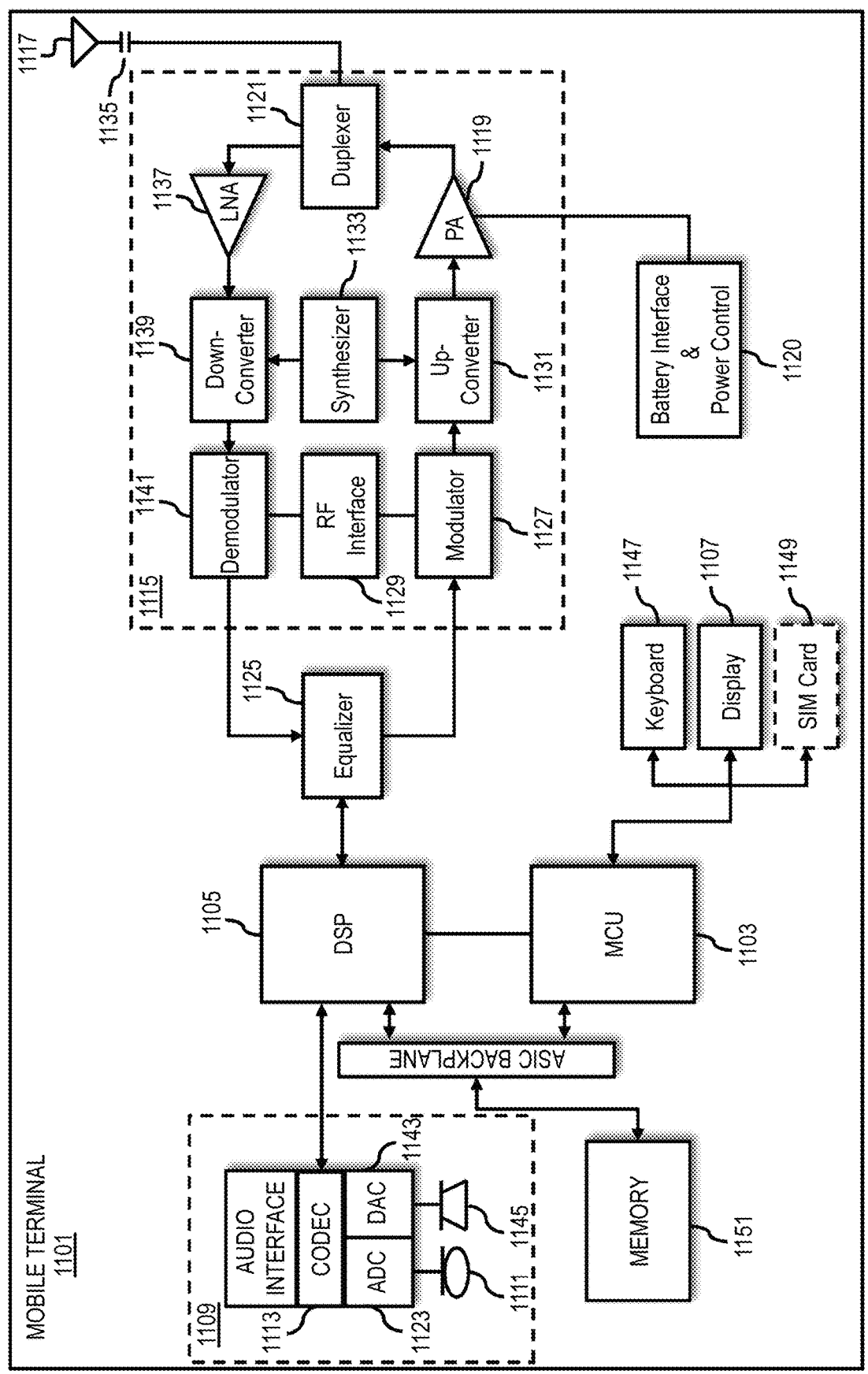
FIG. 11 is a diagram of a mobile terminal (e.g., handset or vehicle or part thereof) that can be used to implement an embodiment.

FIG. 11 is a diagram of exemplary components of a mobile terminal (e.g., a UE 205, vehicle 201 or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to compare and assimilate cartographic representations (e.g., road lanes) using geospatial data and attribute data. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network.

The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for updating digital map data, the method comprising:
   receiving a first road lane representation and a second road lane representation, wherein each road lane representation comprises respective geometry data and respective attribute data;
   computing a geometric similarity between the first road lane representation and the second road lane representation;
   processing the respective attribute data associated with the first road lane representation and the second road lane representation to determine a semantic relationship between the first lane representation and the second road lane representation;
   generating unique identifications for the first road lane representation and the second road lane representation based on the respective geometry data and the respective attribute data, wherein each respective unique identification comprises a geometric hash based on the respective geometry and an attribute hash based on the respective attribute data;
   comparing the respective geometric hashes, and:
      if the respective geometric hashes do not match, then storing the unique identifications;
      if the respective geometric hashes do match, then comparing the respective attribute hashes and:
         if the respective attribute hashes do match, then storing the unique identifications; and
         if the respective attribute hashes do not match, then recalculating the unique identifications by including at least one shape point from each respective road lane representation and repeating comparison of respective recalculated unique identifications;
   generating a recommendation with respect to assimilating the first road lane representation and the second road lane representation based on the geometric similarity, the semantic relationship, and the stored unique identifications, wherein the recommendation is to ignore, merge, replace or add one or more of the first and second lane representations when updating the digital map data; and
   providing the recommendation as an output.

2. The computer-implemented method of claim 1, wherein the first road lane representation and the second road lane representation are received from different respective sources or from a single source at different respective times.

3. The computer-implemented method of claim 1, further comprising:
   determining a first road boundary representation associated with the first road lane representation and a second road boundary representation associated with the second road lane representation;

computing a boundary geometric similarity between the first road boundary representation and the second road boundary representation;

processing boundary attribute data associated with the first road boundary representation and the second road boundary representation to determine a boundary semantic relationship between the first lane representation;

wherein the recommendation is based on the boundary geometric similarity and the boundary semantic relationship.

4. The computer-implemented method of claim 1, wherein the geometric similarity is based on a center-line geometry.

5. The computer-implemented method of claim 1, further comprising:

determining the geometric similarity based on a distance metric classifying the first road lane representation and the second road lane representation as geometrically similar based on determining that the distance metric indicates that the first road lane representation and the second road lane representation differ by less than a distance threshold.

6. The computer-implemented method of claim 5, wherein distance threshold is based on a width, a length, or a combination thereof of a road lane.

7. The computer-implemented method of claim 1, further comprising:

processing the attribute data to determine intersection data for the first road lane representation and the second road lane representation, wherein the intersection data is based on a binary representation of an intersection condition along the first road lane representation and the second road lane representation, and wherein the semantic relationship is further based on the intersection data.

8. The computer-implemented method of claim 7, wherein the intersection data is based on a binary representation of an intersection condition along the first road lane representation and the second road lane representation.

9. The computer-implemented method of claim 1, further comprising:

designating at least one attribute of the attribute data as a deterministic attribute, wherein a matching or a non-matching of the deterministic attribute between the first road lane representation and the second road lane representation further determines the recommendation.

10. The computer-implemented method of claim 1, wherein the semantic relationship is determined with respect to a nomenclature of relationships, and wherein the nomenclature of relationships includes respective classification criteria for the plurality of relationships in the nomenclature of relationships.

11. The computer-implemented method of claim 1, further comprising:

initiating an assimilation of the first road lane representation and the second road lane representation based on the output.

12. An apparatus for updating digital map data, the apparatus comprising:

at least one processor; and at least one memory including computer program code for one or more programs, the at least one memory and the computer program code configured to, with the at least one processor, cause the apparatus to perform at least the following, receive a first cartographic feature representation and a second cartographic feature representation, wherein each cartographic feature representation comprises respective geometry data and respective attribute data;

computing a geometric similarity between the first cartographic feature representation and the second cartographic feature representation;

processing the respective attribute data associated with the first cartographic feature representation and the second cartographic feature representation to determine a semantic relationship between the first cartographic feature representation and the second cartographic feature representation;

generating unique identifications for the first cartographic feature representation and the second cartographic feature representation based on the respective geometry data and the respective attribute data, wherein each respective unique identification comprises a geometric hash based on the respective geometry and an attribute hash based on the respective attribute data;

comparing the respective geometric hashes, and:
if the respective geometric hashes do not match, then storing the unique identifications;
if the respective geometric hashes do match, then comparing the respective attribute hashes and:
if the respective attribute hashes do match, then storing the unique identifications; and
if the respective attribute hashes do not match, then recalculating the unique identifications by including at least one shape point from each respective cartographic feature representation and repeating comparison of respective recalculated unique identifications;

generating a recommendation with respect to assimilating the first cartographic feature representation and the second cartographic feature representation based on the geometric similarity, the semantic relationship, and the stored unique identifications, wherein the recommendation is to ignore, merge, replace or add one or more of the first and second cartographic feature representations when updating digital map data; and providing the recommendation as an output.

13. The apparatus of claim 12, wherein the first cartographic feature representation and the second cartographic feature representation are received from different respective sources or from a single source at different respective times.

14. A non-transitory computer-readable storage medium, carrying one or more sequences of one or more instructions which, when executed by one or more processors, cause an apparatus to at least perform the following steps:

receiving a first road lane representation and a second road lane representation, wherein each road lane representation comprises respective geometry data and respective attribute data;

computing a geometric similarity between a first road lane representation and second road lane representation;

processing the respective attribute data associated with the first road lane representation and the second road lane representation to determine a semantic relationship between the first lane representation and the second road lane representation;

generating unique identifications for the first road lane representation and the second road lane representation based on the respective geometry data and the respective attribute data, wherein each respective unique identification comprises a geometric hash based on the respective geometry and an attribute hash based on the respective attribute data;

comparing the respective geometric hashes, and:
- if the respective geometric hashes do not match, then storing the unique identifications;
- if the respective geometric hashes do match, then comparing the respective attribute hashes and:
  - if the respective attribute hashes do match, then storing the unique identifications; and
  - if the respective attribute hashes do not match, then recalculating the unique identifications by including at least one shape point from each respective road lane representation and repeating comparison of respective recalculated unique identifications;

generating a recommendation with respect to assimilating the first road lane representation and the second road lane representation based on the geometric similarity, the semantic relationship, and the stored unique identifications, wherein the recommendation is to ignore, merge, replace or add one or more of the first and second lane representations when updating digital map data; and providing the recommendation as an output.

15. The non-transitory computer-readable storage medium of claim 14, wherein the apparatus is caused to further perform:
determining a first road boundary representation associated with the first road lane representation and a second road boundary representation associated with the second road lane representation;
computing a boundary geometric similarity between the first road boundary representation and the second road boundary representation;
processing boundary attribute data associated with the first road boundary representation and the second road boundary representation to determine a boundary semantic relationship between the first lane representation;
wherein the recommendation is based on the boundary geometric similarity and the boundary semantic relationship.

16. The non-transitory computer-readable storage medium of claim 14, wherein the geometric similarity is based on a center-line geometry.

17. The non-transitory computer-readable storage medium of claim 14, wherein the apparatus is caused to further perform:
determining the geometric similarity based on a distance metric
classifying the first road lane representation and the second road lane representation as geometrically similar based on determining that the distance metric indicates that the first road lane representation and the second road lane representation differ by less than a distance threshold.

18. The non-transitory computer-readable storage medium of claim 17, wherein distance threshold is based on a width, a length, or a combination thereof of a road lane.

* * * * *